US009826448B2

(12) United States Patent
Le et al.

(10) Patent No.: US 9,826,448 B2
(45) Date of Patent: Nov. 21, 2017

(54) HANDOVER MANAGEMENT IN AIR-TO-GROUND WIRELESS COMMUNICATION

(71) Applicant: QUALCOMM Incorporated, San Diego, CA (US)

(72) Inventors: Hai Truong Le, San Diego, CA (US); Kalyan Kuppuswamy, San Diego, CA (US); Srikant Jayaraman, San Diego, CA (US); Rajakumar Ebenezar Devairakkam, Chennai (IN); Ebenezer Pugalenthi Samuel, San Diego, CA (US); Ruoheng Liu, San Diego, CA (US); Sunil Kumar Kamavaram, San Diego, CA (US); Chanakya Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/329,437

(22) Filed: Jul. 11, 2014

(65) Prior Publication Data
US 2016/0014657 A1    Jan. 14, 2016

(51) Int. Cl.
*H04W 36/00*    (2009.01)
*H04W 36/08*    (2009.01)

(52) U.S. Cl.
CPC ....... *H04W 36/08* (2013.01); *H04W 36/0083* (2013.01)

(58) Field of Classification Search
CPC .................................................... H04W 36/08
(Continued)

(56) References Cited

U.S. PATENT DOCUMENTS 7,751,814 B2    7/2010   Cruz et al.
8,249,585 B2 *  8/2012   Tronc ................. H04B 7/18563
                                             370/453
(Continued)

FOREIGN PATENT DOCUMENTS

WO    WO-2009/155992 A1    12/2009
WO    WO-2011/123755 A1    10/2011
(Continued)

OTHER PUBLICATIONS

International Search Report and Written Opinion—PCT/US2015/037461—ISA/EPO—Oct. 23, 2015-10-23. (13 pages).

*Primary Examiner* — Kamran Afshar
*Assistant Examiner* — Farid Seyedvosoghi
(74) *Attorney, Agent, or Firm* — Arent Fox, LLP

(57) ABSTRACT

Managing handover procedures of two or more modems from a serving base station to a target base station includes receiving at least one message indicative of at least one measurement report of radio conditions from at least one modem of the two or more modems; determining, based on the at least one message, whether to handover the two or more modems from the serving base station to the target base station; and upon determining to handover the two or more modems from the serving base station to the target base station, indicating to each of the two or more modems to send to the serving base station a measurement report configured to trigger a respective handover procedure from the serving base station to the target base station.

30 Claims, 15 Drawing Sheets

(58) Field of Classification Search
USPC .................................. 455/436, 425, 431
See application file for complete search history.

(56) References Cited

U.S. PATENT DOCUMENTS

| | | | | |
|---|---|---|---|---|
| 8,538,435 | B2* | 9/2013 | Immendorf | H04W 24/00 455/436 |
| 2006/0229076 | A1* | 10/2006 | Monk | H04W 16/28 455/442 |
| 2011/0105119 | A1 | 5/2011 | Bienas et al. | |
| 2011/0111753 | A1* | 5/2011 | Vainikka | H04W 36/32 455/425 |
| 2012/0021740 | A1 | 1/2012 | Vaidyanathan et al. | |
| 2013/0183979 | A1* | 7/2013 | Chen | H04W 36/30 455/436 |
| 2013/0195005 | A1* | 8/2013 | Al-Shalash | H04W 36/16 370/315 |
| 2013/0322325 | A1* | 12/2013 | Hahn | H04W 36/0055 370/315 |
| 2014/0057634 | A1 | 2/2014 | Chang et al. | |

FOREIGN PATENT DOCUMENTS

| | | |
|---|---|---|
| WO | WO-2012/134116 A2 | 10/2012 |
| WO | WO-2014/081354 A1 | 5/2014 |

* cited by examiner

HANDOVER MANAGEMENT IN AIR-TO-GROUND WIRELESS COMMUNICATION

BACKGROUND

The present disclosure relates generally to wireless communications, and more particularly, to handover management in air-to-ground wireless communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Recently, some wireless communication systems have been developed to support wireless communication between a ground base station and a number of modems on an aircraft. However, when some modems on an aircraft are in a handover condition, it may be difficult for a beamforming component of an antenna system of the aircraft and for a beamforming component of the ground base station to facilitate multiple modems and proceed with handover procedures.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, the disclosure provides a method of managing handover procedures of two or more modems from a serving base station to a target base station, the method including receiving at least one message indicative of at least one measurement report of radio conditions from at least one modem of the two or more modems; determining, based on the at least one message, whether to handover the two or more modems from the serving base station to the target base station; and upon determining to handover the two or more modems from the serving base station to the target base station, indicating to each of the two or more modems to send to the serving base station a measurement report configured to trigger a respective handover procedure from the serving base station to the target base station.

In another aspect, the disclosure provides an apparatus for managing handover procedures of two or more modems from a serving base station to a target base station, the apparatus including a handover management component configured to receive at least one message indicative of at least one measurement report of radio conditions from at least one modem of the two or more modems; and a handover deciding component configured to determine, based on the at least one message, whether to handover the two or more modems from the serving base station to the target base station; wherein the handover deciding component is further configured to, upon determining to handover the two or more modems from the serving base station to the target base station, indicate to each of the two or more modems to send to the serving base station a measurement report configured to trigger a respective handover procedure from the serving base station to the target base station.

In a further aspect, the disclosure provides an apparatus for managing handover procedures of two or more modems from a serving base station to a target base station including means for receiving at least one message indicative of at least one measurement report of radio conditions from at least one modem of the two or more modems; means for determining, based on the at least one message, whether to handover the two or more modems from the serving base station to the target base station; and means for, upon determining to handover the two or more modems from the serving base station to the target base station, indicating to each of the two or more modems to send to the serving base station a measurement report configured to trigger a respective handover procedure from the serving base station to the target base station.

In yet another aspect, the disclosure provides a non-transitory computer-readable medium executable by a processor for managing handover procedures of two or more modems from a serving base station to a target base station, the computer-readable medium including code for receiving at least one message indicative of at least one measurement report of radio conditions from at least one modem of the two or more modems; code for determining, based on the at least one message, whether to handover the two or more modems from the serving base station to the target base station; and code for, upon determining to handover the two or more modems from the serving base station to the target base station, indicating to each of the two or more modems to send to the serving base station a measurement report configured to trigger a respective handover procedure from the serving base station to the target base station.

These and other aspects of the present disclosure will become more fully understood upon a review of the detailed description, which follows.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may represent optional elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

As used herein, an air-to-ground (AG) wireless communication system is a wireless communication system that provides wireless communication between a device on the ground (e.g., a ground base station) and a device (e.g., a modem) on an airborne vehicle such as an aircraft.

As used herein, an AirCard is a device that is installed on an airborne vehicle and includes one or more modems that communicate with a ground base station in an AG wireless communication system to provide broadband connectivity services to the airborne vehicle.

Some aspects of the present disclosure provide handover management for broadband connectivity services to an aircraft. In some aspects, for example, at any given time, since a single beam is provided from a ground base station to the aircraft and from an aircraft antenna system to the ground base station, all modems on an aircraft may need to perform simultaneous handover to a target ground base station. Accordingly, in some present aspects, a handover manager is provided that synchronizes the handover of multiple modems on an aircraft.

The present aspects may be implemented in accordance with any radio access technology (RAT). However, some non-limiting example aspects are described herein with reference to the long term evolution (LTE) RAT.

Figure 1:
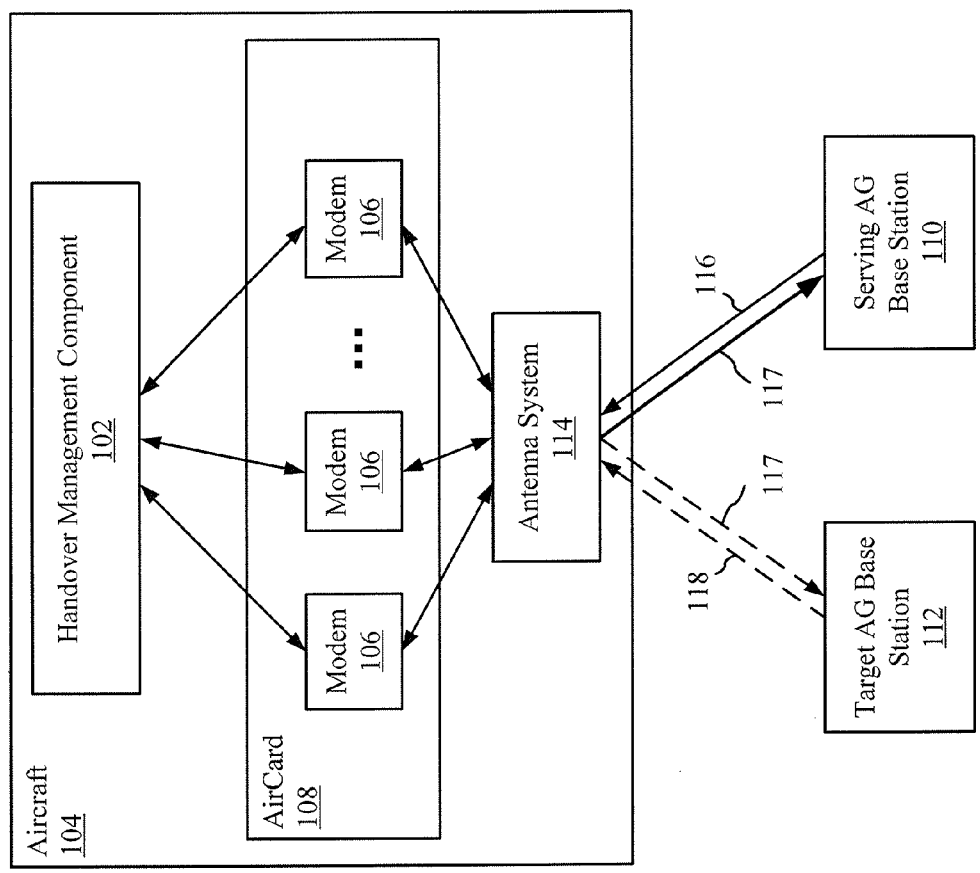
FIG. 1 is a diagram illustrating an example of an air-to-ground (AG) wireless communication system according to some present aspects.

Referring to FIG. 1, an AG wireless communication system 100 is illustrated with aspects including handover management component 102 configured to provide handover management for broadband connectivity services to an aircraft 104. For example, in some aspects, handover management component 102 may communicate with a plurality of modems 106 within AirCard 108 installed in aircraft 104 to manage the handover of modems 106 from serving AG base station 110 to target AG base station 112. In some aspects, the term "component" as used herein may be one of the parts that make up a system, may be hardware or software, and may be divided into other components.

In some aspects, for example, in order to provide broadband connectivity in a certain RAT to aircraft 104 while managing interference to co-existent communications in other RATs that use a same frequency band (e.g., satellite operations), serving AG base station 110 and/or target AG base station 112 may perform beamforming using a large antenna array to form a narrow pencil beam with high antenna gain toward the direction of aircraft 104. For example, serving AG base station 110 may generate serving beam 116 to facilitate data transmission, and, after the handover procedure, target AG base station 112 may generate target beam 118 to facilitate data transmission. In these aspects, for example, aircraft 104 includes antenna system 114, which may perform beamforming using multiple antenna elements. For example, in some aspects, antenna system 114 may generate beam 117 that is used by modems 106 to communicate with serving AG base station 110. In these aspects, during handover procedures, beam 117 may steer toward target AG base station 112 in order to establish a wireless connection to target AG base station 112.

In some aspects, for example, AirCard 108 installed in aircraft 104 may include any number of modems 106 which may be operating on different carriers to provide broadband connectivity bandwidth. In some aspects, for example, each modem 106 of AirCard 108 may operate independently of other modems 106. That is, different modems 106 of AirCard 108 may independently communicate with serving AG base station 110 on one or more carrier frequencies. In one non-limiting example aspect, AirCard 108 may include 5 modems 106, each providing a 20 MHz bandwidth for broadband connectivity. Accordingly, such example AirCard 108 may provide a total of 100 MHz bandwidth. In some non-limiting example aspects, airplane 104 may have two or more AirCards 108 installed thereon. However, in these aspects, serving AG base station 110 may serve different modems 106 of different AirCards 108 using one beam, e.g., beam 116, directed toward aircraft 104. Similarly, in these aspects, antenna system 114 of aircraft 104 may serve different modems 106 of different AirCards 108 using one beam, e.g., beam 117, directed toward serving AG base station 110.

In some aspects, for example, due to differences in radio conditions and admission limits on target AG base station 112, different modems 106 on aircraft 104 may be in a handover condition to trigger a handover from serving AG base station 110 to target AG base station 112 at different times. Conventionally, handover procedures of different modems 106 may be triggered at different times, which may make it difficult for a beamforming component of serving AG base station 110 to decide when to stop providing serving beam 116. Similarly, when handover procedures of different modems 106 are triggered at different times, it may be difficult for a beamforming component of target AG base station 112 to decide when to begin providing target beam 118 to serve aircraft 104. Further, when handover procedures of different modems 106 are triggered at different times, it may be difficult for a beamforming component of antenna system 114 of aircraft 104 to decide when to steer beam 117 from serving AG base station 110 toward target AG base station 112.

However, according to some present aspects, AirCard 104 includes handover management component 102 that manages the handover procedures for modems 106 of AirCard 108 to address the above-noted concerns. For example, in one aspect, handover management component 102 may communicate with modems 106 to synchronize the handover of all modems 106 from serving AG base station 110 to target AG base station 112. As such, during the handover procedure, the antenna system 114 of aircraft 104 may steer beam 117, which is used by all modems 106 to communicate with a respective one of serving AG base station 110 or target base station 112, form serving AG base station 110 to target AG base station 112. Furthermore, after the handover procedures, serving AG base station 110 may stop providing a beam, e.g., serving beam 116, and, meanwhile, target AG base station 112 may generate a new single narrow beam, e.g., target beam 118, to serve modems 106 in aircraft 104.

Figure 2:
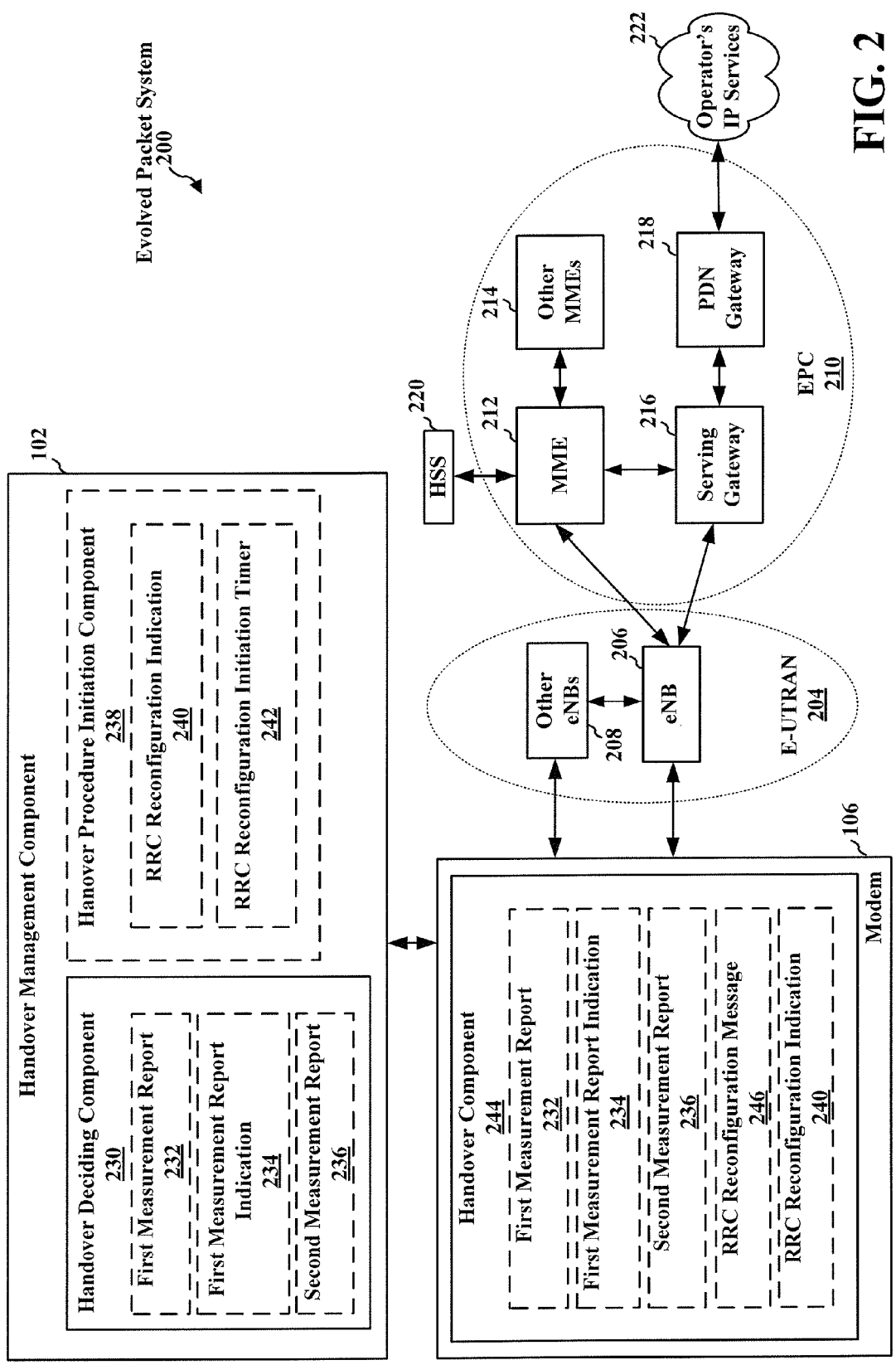
FIG. 2 is a diagram illustrating an example of a network architecture for wireless communications according to some present aspects.

In some present aspects, AG wireless communication system 100 provides broadband connectivity services to aircraft 104 based on Long Term Evolution (LTE) radio access technology (RAT), as illustrated herein with reference to FIG. 2. In FIG. 2, an LTE network architecture 200 is illustrated which may be referred to as an Evolved Packet System (EPS) 200. EPS 200 includes handover manager component 102 that manages the handover of a number of modems 106 in AirCard 108 (not shown) that is installed in aircraft 104 (not shown). The EPS 200 may further include an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services. Moreover, while aspects of this disclosure are presented with respect to an LTE network architecture, the same or similar aspects may be extended to other types of networks.

The E-UTRAN includes the evolved Node B (eNB) 206 which may be an example of serving AG base station 110 that serves modem 106. The E-UTRAN also includes other eNBs 208 which may be an example of target AG base station 112 that may be a target base station for a handover of modem 106. The eNB 206 can provide user and control planes protocol terminations toward modem 106. The eNB 206 may be connected to the other eNBs 208, e.g., target AG base station 112, via a backhaul (e.g., an X2 interface). The eNB 206 and other eNBs 208 may also be referred to as a base station, a base transceiver station, a radio base station, a radio transceiver, a transceiver function, a basic service set (BSS), an extended service set (ESS), or some other suitable terminology. The eNB 206 can provide an access point to the EPC 210 for modem 106. In some aspects, for example, non-limiting examples of modem 106 may include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. Modem 106 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an user equipment, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the modem 106 and the EPC 210. Generally, the MME 212 provides bearer and connection management. All user IP packets can be transferred through the Serving Gateway 216, which itself is connected to the PDN Gateway 218. The PDN Gateway 218 can provide UE IP address allocation as well as other functions. The PDN Gateway 218 is connected to the Operator's IP Services 222. The Operator's IP Services 222 may include the Internet, the Intranet, an IP Multimedia Subsystem (IMS), and a PS Streaming Service (PSS).

In some aspects, modem 106 may include handover component 244 that performs measurement of radio conditions related to radio communication channels between modem 106 and eNB 206 and/or other eNBs 208 to determine first measurement report 232. In some aspects, for example, some or all modems 106 of AirCard 108 (see FIG. 1) include separate handover components 244 that perform respective measurements of radio conditions related to respective radio communication channels in use by the respective modem 106.

Then, modem 106 and/or handover component 244 send first measurement report 232 to handover management component 102. In some alternative or additional aspects, instead of or in addition to sending first measurement report 232 to handover management component 102, modem 106 and/or handover component 244 may send first measurement report indication 234 indicative of first measurement report 232 to handover management component 102 when such measurements indicate that modem 106 is in handover condition. As used herein, handover condition refers to a condition where modem 106 needs to be handed over from eNB 206 to one of the other eNBs 208. For example, in some aspects, modem 106 is in handover condition when radio conditions of a serving eNB and a target eNB as reported in first measurement report 232 meet respective handover trigger threshold values. In some aspects, for example, first measurement report indication 234 may also include first measurement report 232.

In some aspects, handover management component 102 receives and stores respective first measurement reports 232 and/or first measurement report indications 234 from two or more modems 106 of AirCard 108 (see FIG. 1) installed on aircraft 104 (see FIG. 1).

Subsequently, based on first measurement reports 232 and/or first measurement report indications 234 received from modems 106, handover management component 102 and/or handover deciding component 230 of handover management component 102 may determine that modem 106 should send a measurement report to eNB 206 to trigger a handover of modem 106 from eNB 206 to another eNB 208. For example, in some aspects, if first measurement reports 232 and/or first measurement report indications 234 received from modems 106 indicate that there are a number of modems 106 (e.g., more than one modem 106) whose radio conditions meet respective handover trigger threshold values, handover management component 102 and/or handover deciding component 230 may determine that each modem 106 sends a measurement report to eNB 206, e.g., a serving eNB, to trigger a handover of modem 106 from eNB 206 to another eNB 208, e.g., a target eNB.

Then, in some aspects, for example, handover management component 102 and/or handover deciding component 230 send a message to all modems 106 of AirCard 108 (see FIG. 1) of aircraft 104 (see FIG. 1) indicating that all modems 106 send a measurement report to serving eNB 206 to trigger a handover of modems 106 of AirCard 108 (see FIG. 1) of aircraft 104 (see FIG. 1) from eNB 206 to another eNB 208.

In some aspects, for example, handover management component 102 and/or handover deciding component 230 indicate to a respective modem 106 to send a respective first measurement report 232 to eNB 206 when radio conditions corresponding to the respective first measurement report 232 meet respective handover trigger threshold values.

In some alternative aspects, for example, when radio conditions corresponding to a first measurement report 232 of a respective modem 106 do not meet respective handover trigger threshold values, handover management component 102 and/or handover deciding component 230 may indicate to such modem 106 to send a second measurement report 236 different than the first measurement report 232 to eNB 206 to trigger a handover of such modem 106 from eNB 206 to another eNB 208. In other words, second measurement report 236 may not accurately reflect the radio conditions at the respective modem 106, but handover management component 102 and/or handover deciding component 230 may cause the respective modem 106 to send second measurement report 236 in order to achieve a synchronization of handovers by multiple modems 106 (e.g., when at least one modem is experiencing a handover condition).

Subsequently, upon receiving a respective first measurement report 232 or second measurement report 236, eNB 206 performs handover preparation as defined in the LTE standard. For example, in some aspects, eNB 206 sends a radio resource control (RRC) connection reconfiguration message 246 to a respective modem 106.

Subsequently, modem 106 and/or handover component 244 send RRC reconfiguration indication 240, e.g., an acknowledgement signal, to handover management component 102 to indicate the reception of RRC reconfiguration message 246.

Based on RRC reconfiguration indication 240, handover management component 102 and/or handover procedure initiation component 238 determine to start a random access procedure for that modem 106. For example, in some aspects, upon receiving RRC reconfiguration indication 240 from a modem 106 of AirCard 104 (see FIG. 1) of aircraft 104 (see FIG. 1), handover management component 102 and/or handover procedure initiation component 238 notify antenna system 114 (see FIG. 1) to steer beam 117 (see FIG. 1) from eNB 206 to another eNB 208, and then cause each of the modems 106 of AirCard 104 (see FIG. 1) of aircraft 104 (see FIG. 1) to start a respective random access procedure.

Figure 3:
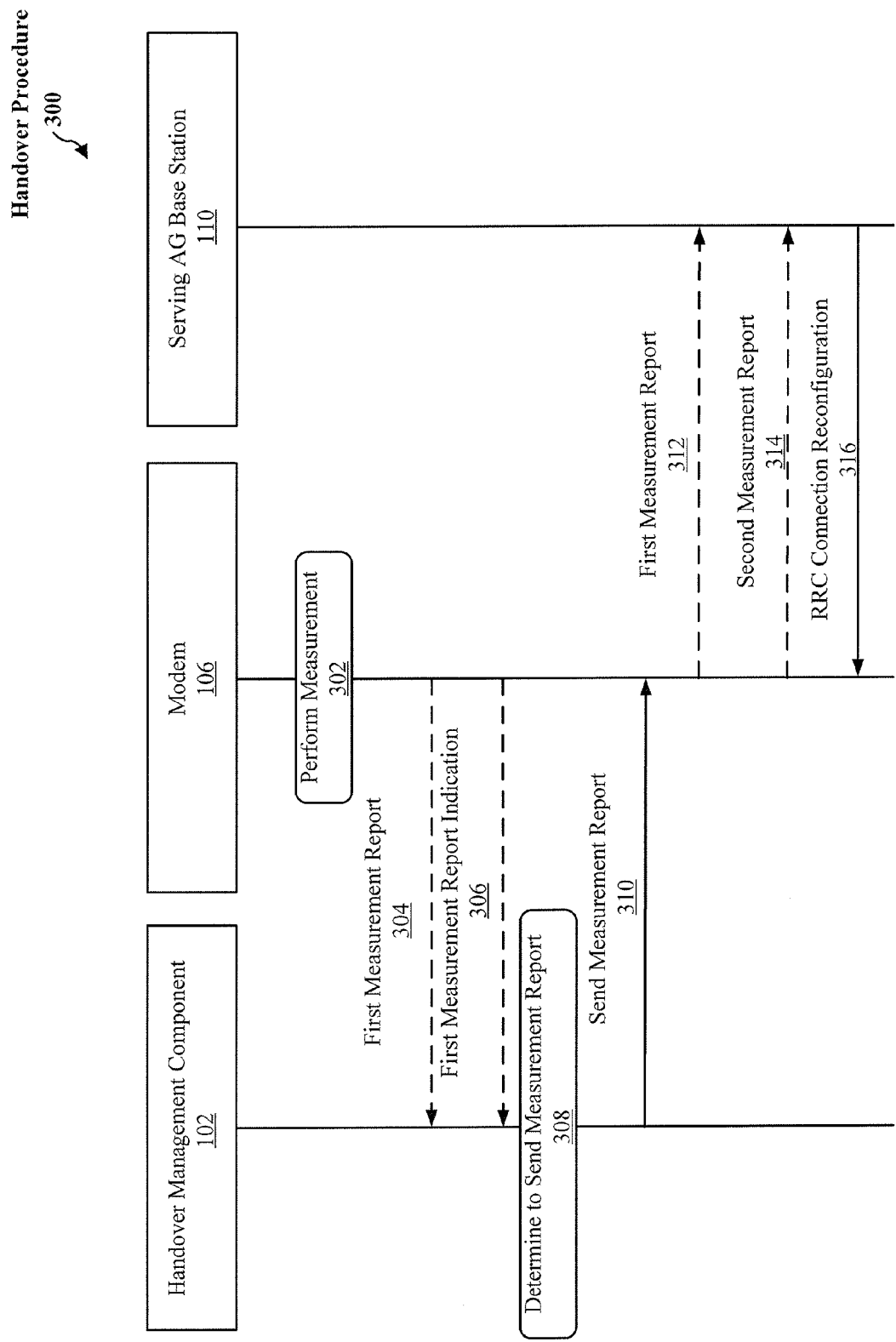
FIGS. 3 and 4 illustrate example handover procedures in some present aspects.
Figure 4:
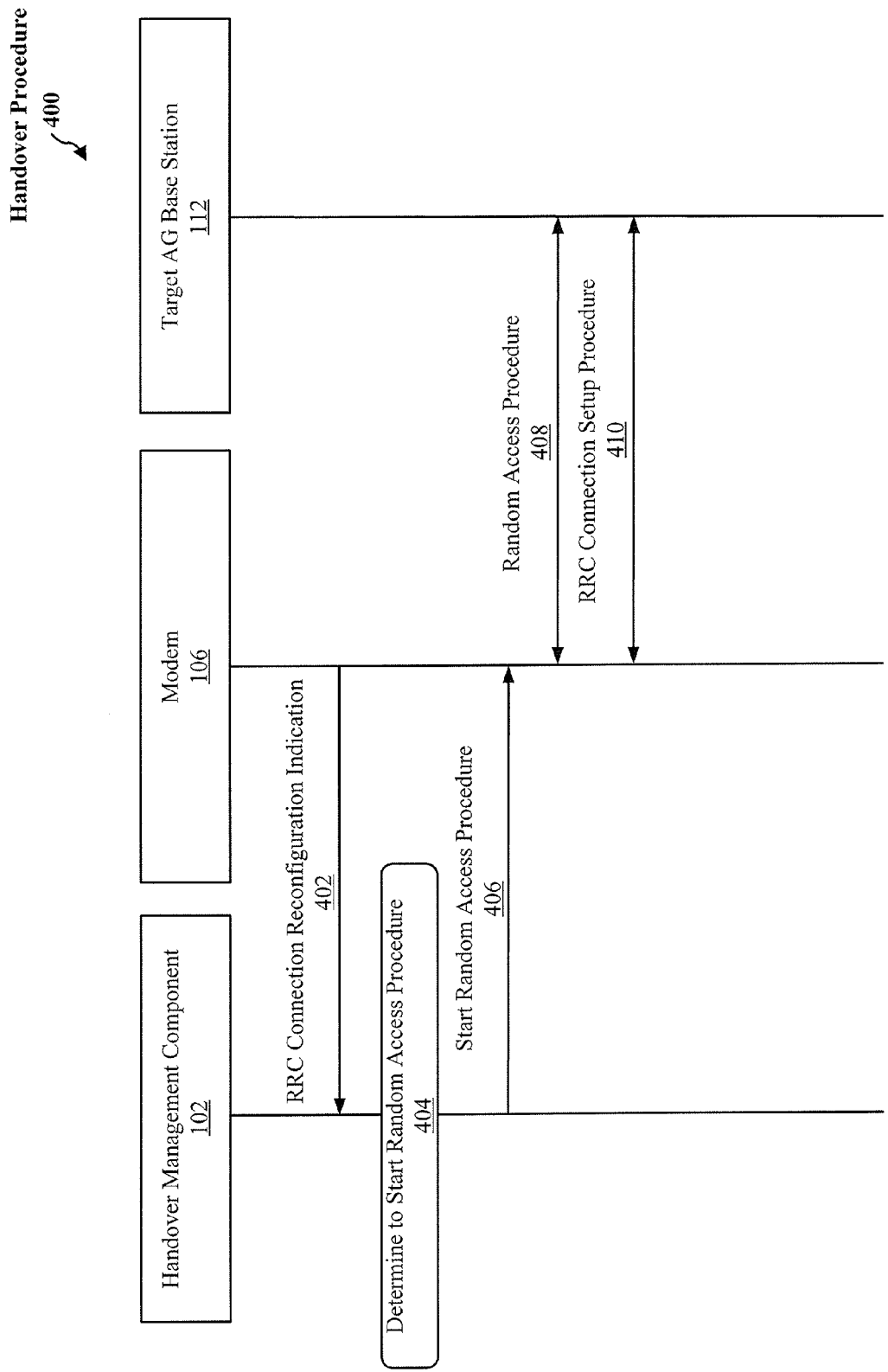

FIGS. 3 and 4 illustrate example handover procedures 300 and 400 for handover of a modem 106 from serving AG base station 110 of FIG. 1 (or, in some example aspects, from eNB 206 of FIG. 2) to target AG base station 112 of FIG. 1 (or, in some example aspects, to one of the other eNBs 208 of FIG. 2) in AG wireless communication system 100 of FIG. 1 (or, in some example aspects, in evolved packet system 200 of FIG. 2), according to some present aspects.

Referring to FIG. 3, in handover procedure 300, modem 106 performs measurement 302 of radio conditions related to radio communication channels between modem 106 and serving AG base station 110 and/or target AG base station 112. In some aspects, for example, some or all modems 106 of AirCard 108 (see FIG. 1) perform respective measurements of radio conditions related to respective radio communication channels.

Then, modem 106 sends first measurement report 304 of the performed measurement 302 to handover management component 102. In some alternative or additional aspects, modem 106 may send first measurement report indication 306 of the performed measurement 302 to handover management component 102. For example, in some aspects, modem 106 may send first measurement report indication 306 of the performed measurement 302 to handover management component 102 when such measurements indicate that modem 106 is in handover condition, that is, modem 106 needs to be handed over from serving AG base station 110 to target AG base station 112. For example, in some aspects, modem 106 is in handover condition when radio conditions of serving AG base station 110 and target AG base station 112 in first measurement report 304 meet respective handover trigger threshold values. In some aspects, for example, first measurement report indication 306 may also include first measurement report 304 of the performed measurement 302.

In some aspects, handover management component 102 receives and stores respective first measurement reports 304 and/or first measurement report indications 306 from two or more modems 106 of AirCard 108 (see FIG. 1) installed on aircraft 104 (see FIG. 1).

Subsequently, at block 308, based on first measurement reports 304 and/or first measurement report indications 306 received from modems 106, handover management component 102 may determine that modem 106 should send a measurement report to serving AG base station 110 to trigger a handover of modem 106 from serving AG base station 110 to target AG base station 112. For example, in some aspects, if first measurement reports 304 and/or first measurement report indications 306 received from modems 106 indicate that there are a number of modems 106 (e.g., more than one modem 106) whose radio conditions (as indicated by first measurement reports 304 and/or first measurement report indications 306) meet respective handover trigger threshold values, at block 308, handover management component 102 may determine that each modem 106 sends a measurement report to serving AG base station 110 to trigger a handover of modem 106 from serving AG base station 110 to target AG base station 112.

In some aspects, for example, a handover preparation trigger threshold may be configured in handover management component 102 such that, at block 308, if first measurement reports 304 and/or first measurement report indications 306 received from modems 106 indicate that the number of modems 106 whose radio conditions meet respective handover trigger threshold values is more than the handover preparation trigger threshold, handover management component 102 at block 308 determines that each modem 106 sends a measurement report to serving AG base station 110 to trigger a handover of modem 106 from serving AG base station 110 to target AG base station 112.

In some aspects, for example, once at block 308 handover management component 102 determines that modems 106 send a measurement report to serving AG base station 110 to trigger a handover of modems 106 from serving AG base station 110 to target AG base station 112, handover management component 102 sends a message 310 to modems 106 of AirCard 108 (see FIG. 1) of aircraft 104 (see FIG. 1) indicating that modems 106 send a measurement report to serving AG base station 110 to trigger a handover of modems 106 of AirCard 108 (see FIG. 1) of aircraft 104 (see FIG. 1) from serving AG base station 110 to target AG base station 112.

In some aspects, for example, message 310 may indicate to a modem 106 to send a message 312 including a respective first measurement report to serving AG base station 110 when radio conditions corresponding to the respective first measurement report 304 meet respective handover trigger threshold values.

In some alternative aspects, for example, when some modems 106 are experiencing handover conditions, while radio conditions corresponding to a first measurement report of a modem 106 do not meet respective handover trigger threshold values, handover management component 102 sends a message 310 to such modem 106 to indicate that such modem 106 sends a message 314 including a second measurement report different than the first measurement report to serving AG base station 110 to trigger a handover of such modem 106 from serving AG base station 110 to target AG base station 112. In some aspects, for example, the value of the second measurement report may be the value of a measurement report from another modem 106 (of Aircard 108) which met a corresponding handover trigger threshold value. That is, since based on the first measurement report, radio conditions of such modem 106 do not meet respective handover trigger threshold values, sending such first measurement report to serving AG base station 110 would not trigger a handover of such modem 106. Accordingly, in order to trigger a handover of such modem 106, handover management component 102 sends a message 310 to such modem 106 to indicate that such modem 106 sends a message 314 including a second measurement report different than the first measurement report to trigger a handover from serving AG base station 110 to target AG base station 112. Thus, such second measurement report may not be indicative of true radio conditions of such modem 106, e.g., may be a fake measurement report of such modem 106.

Accordingly, in some present aspects, modems 106 do not send a measurement report to serving AG base station 110 unless modems 106 receive a message 310 from handover management component 102.

Upon receiving, from modem 106, message 312 including a respective first measurement report or message 314 including a respective second measurement report, serving AG base station 110 performs handover preparation as defined, for example, in the LTE standard. For example, in some aspects, upon receiving message 312 including a respective first measurement report or message 314 including a respective second measurement report, serving AG base station 110 send a radio resource control (RRC) connection reconfiguration message 316 to a respective modem 106.

Referring to FIG. 4, further aspects of a handover procedure 400 are illustrated following the reception of RRC connection reconfiguration message 316 (see FIG. 3) from serving AG base station 110 (see FIG. 3) by modem 106. Upon receiving RRC connection reconfiguration message 316 (see FIG. 3) from serving AG base station 110 (see FIG. 3), modem 106 sends message 402 to handover management component 102 to indicate reception of such message.

At block 404, based on receiving message 402, handover management component 102 determines that modem 106 starts a random access procedure. For example, in some aspects, upon receiving message 402 from a modem 106 of AirCard 104 (see FIG. 1) of aircraft 104 (see FIG. 1), handover management component 102 starts a timer and waits for each of the other modems 106 of AirCard 104 (see FIG. 1) of aircraft 104 (see FIG. 1) to send a respective message 402 to indicate a respective RRC connection reconfiguration. In these aspects, and still referring to block 404, upon receiving respective messages 402 from each of the other modems 106 of AirCard 104 (see FIG. 1) of aircraft 104 (see FIG. 1), or, alternatively, upon expiry of the timer, handover management component 102 determines that each of the modems 106 of AirCard 104 (see FIG. 1) of aircraft 104 (see FIG. 1) start a respective random access procedure.

Then, handover management component 102 sends a message 406 to each modem 106 of AirCard 104 (see FIG. 1) of aircraft 104 (see FIG. 1) to indicate to modems 106 to start a respective random access procedure.

Upon receiving message 406, each modem 106 communicates with target AG base station 112 to perform a random access procedure 408 and an RRC connection setup procedure 410, as defined in the LTE standard.

In some present aspects, in performing handover procedure 300, 400, serving AG base station 110 and target AG base station 112 may not be affected by the presence and/or execution of handover management component 102. That is, in order to accommodate handover procedures 300, 400, serving AG base station 110 and/or target AG base station 112 do not require any changes in applicable conventional standards (e.g., in applicable LTE standards) in order to perform a random access procedure and/or an RRC connection setup procedure.

Accordingly, in some present aspects, by synchronizing the handover of multiple modems on an aircraft, an antenna system of the aircraft may provide a single beam toward a single ground base station to serve all modems in the aircraft at any given time, and a single ground base station may provide a beam toward the aircraft to serve all modems in the aircraft at any given time.

FIGS. 5-9 describe methods 500, 600, 700, 800, and 900 respectively, in aspects of the network architecture of FIG. 2 which may be an example of AG wireless communication system 100 of FIG. 1. For example, methods 500, 600, 700, 800, and 900 may be performed by handover management component 102 (FIGS. 1 and 2) as described herein to manage handover procedures of modems 106 of AirCard 108 installed in aircraft 104 from serving AG base station 110 to target AG base station 112, where method 500 relates to an aspect of managing handover procedures of two or more modems from a serving base station to a target base station, method 600 relates to an aspect of determining, based on the at least one message, whether to handover the two or more modems from the serving base station to the target base station, method 700 relates to an aspect of indicating to each of the two or more modems to send to the serving base station the measurement report configured to trigger the respective handover procedure, method 800 relates to an aspect of receiving at least one message indicative of radio conditions from at least one modem in the two or more modems, and method 900 relates to an aspect of determining whether to start handover procedures of the two or more modems from the serving base station to the target base station.

Figure 5:
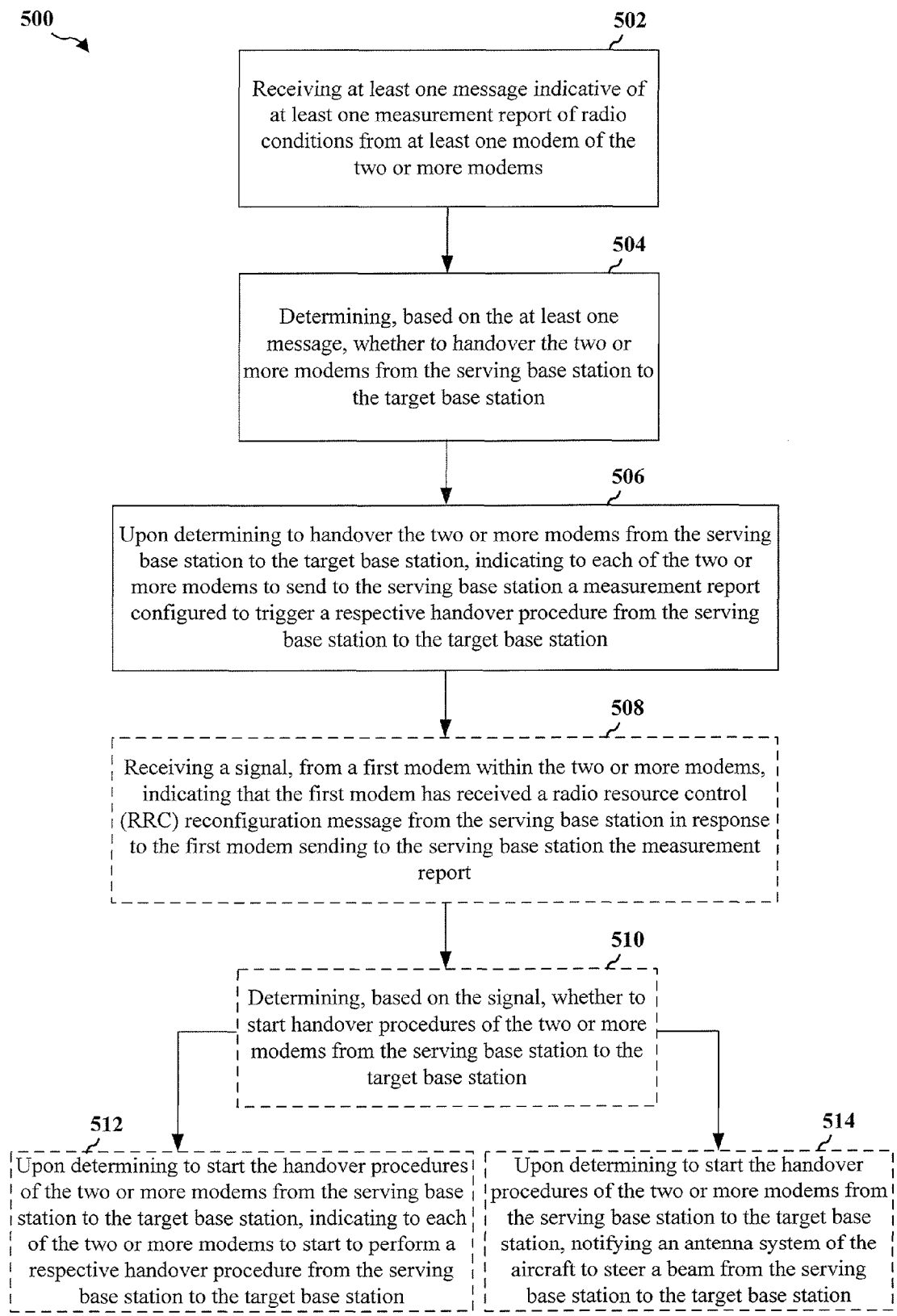
FIGS. 5-9 are flow charts of methods of wireless communications in aspects of the network architecture of FIG. 1.

Referring now to FIG. 5, in an aspect of a method of managing handover procedures of two or more modems from a serving base station to a target base station, at block 502, method 500 includes receiving at least one message indicative of at least one measurement report of radio conditions from at least one modem of the two or more modems. For example, in some aspects, handover management component 102 may receive at least one message indicative of at least one measurement report (e.g., a first measurement report 232) of radio conditions from at least one modem 106 in the two or more modems 106 of AirCard 108 installed in aircraft 104.

At block 504, method 500 includes determining, based on the at least one message, whether to handover the two or more modems from the serving base station to the target base station. For example, in some aspects, handover management component 102 and/or handover deciding component 230 may determine, based on the at least one message received from modems 106, whether to handover the two or more modems 106 from serving AG base station 110 (which may be eNB 206 in FIG. 2) to target AG base station 112 (which may be one of other eNBs 208 in FIG. 2).

At block 506, method 500 includes, upon determining to handover the two or more modems from the serving base station to the target base station, indicating to each of the two or more modems to send to the serving base station a measurement report configured to trigger a respective handover procedure from the serving base station to the target base station. For example, in some aspects, upon determining by handover management component 102 and/or handover deciding component 230 to handover the two or more modems 106 of AirCard 108 of aircraft 104 from serving AG base station 110 to target AG base station 112, handover management component 102 may indicate to each of the two or more modems 106 to send to serving AG base station 110 a measurement report configured to trigger a respective handover procedure from serving AG base station 110 to target AG base station 112.

Optionally, at block 508, method 500 includes receiving a signal, from a first modem of the two or modems, indicating that the first modem has received a radio resource control (RRC) reconfiguration message from the serving base station in response to the first modem sending to the serving base station the measurement report. For example, in an aspect, handover management component may receive a signal, e.g., RRC reconfiguration indication 240, from a modem 106, indicating that the modem 106 has received an RRC reconfiguration message 246 from the serving AG base station 110 in response to the modem 106 sending to the serving AG base station 110 a respective one of the first measurement report 232 or the second measurement report 236.

Optionally, at block 510, method 500 includes determining, based on the signal, whether to start handover procedures of the two or more modems from the serving base station to the target base station. For example, in an aspect, handover management component 102 and/or handover procedure initiation component 238 may determine, based on the RRC reconfiguration indication 240, whether to start handover procedures of the two or more modems 106 from the serving AG base station 110 to the target AG base station 112.

Optionally, at block 512, method 500 includes, upon determining to start the handover procedures of the two or more modems from the serving base station to the target base station, indicating to each of the two or more modems to start to perform a respective handover procedure from the serving base station to the target base station. For example, in an aspect, upon handover management component 102 and/or handover procedure initiation component 238 determining to start the handover procedures of the two or more modems 106 of AirCard 108 of aircraft 104 from the serving AG base station 110 to the target AG base station 112, handover management component 102 may indicate to each of the two or more modems 106 of AirCard 108 of aircraft 104 to start to perform a respective handover procedure from the serving AG base station 110 to the target AG base station 112.

Optionally, at block 514, method 500 includes, when the two or more modems are located in an aircraft, upon determining to start the handover procedures of the two or more modems from the serving base station to the target base station, notifying an antenna system of the aircraft to steer a beam from the serving base station to the target base station. For example, in an aspect, when the two or more modems 106 are located in an aircraft 104, upon handover management component 102 and/or handover procedure initiation component 238 determining to start the handover procedures of the two or more modems 106 of AirCard 108 of aircraft 104 from the serving AG base station 110 to the target AG base station 112, handover management component 102 may notify an antenna system 114 of the aircraft 104 to steer a beam 117 from the serving AG base station 110 to the target AG base station 112.

Figure 6:
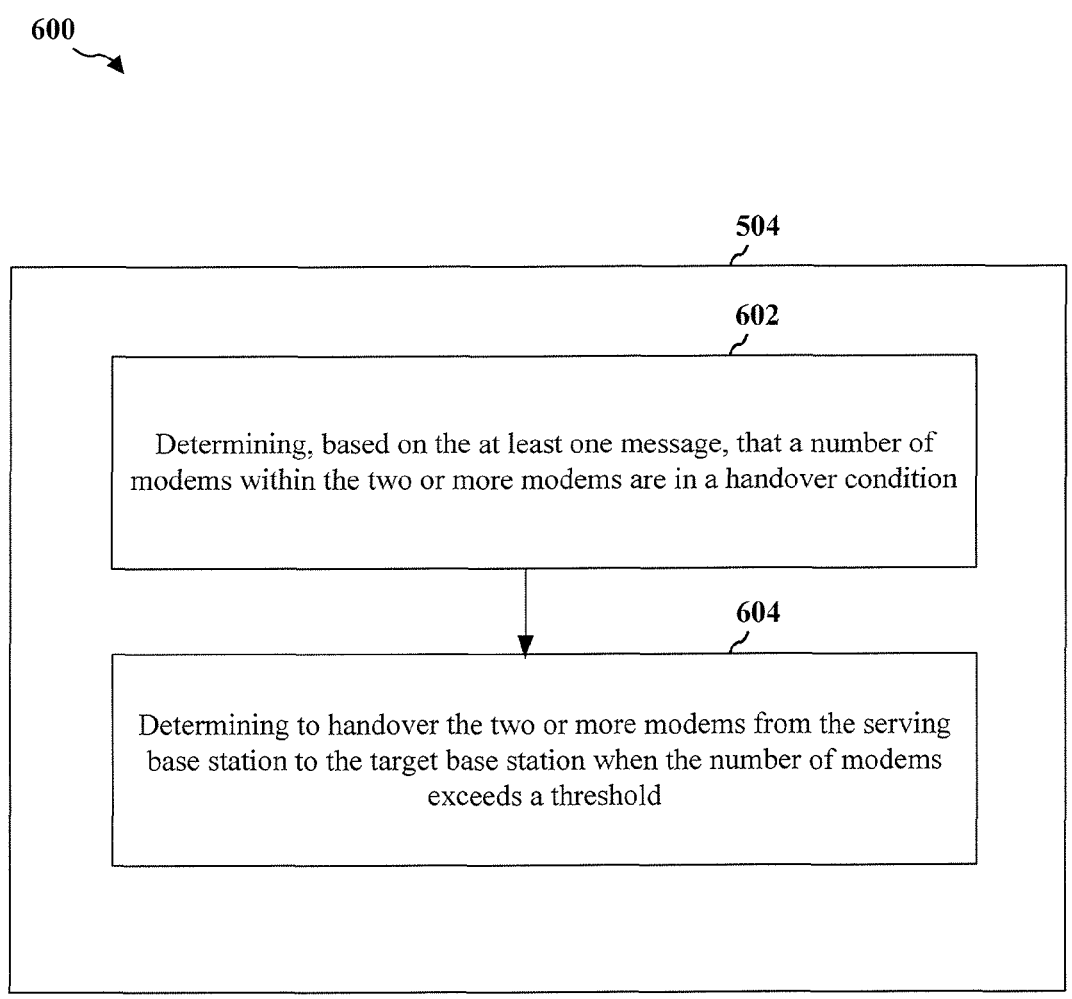

Referring now to FIG. 6, method 600 provides an example and optional aspect of block 504 of FIG. 5 for determining, based on the at least one message, whether to handover the two or more modems from the serving base station to the target base station.

At block 602, method 600 includes determining, based on the at least one message, that a number of modems within the two or more modems are in a handover condition. For example, in an aspect, handover management component 102 and/or handover deciding component 230 may determine, based on the at least one message received from modems 106, that a number of modems 106 of AirCard 108 of aircraft 104 are in a handover condition.

At block 604, method 600 includes determining to handover the two or more modems from the serving base station to the target base station when the number of modems exceeds a threshold. For example, in an aspect, handover management component 102 and/or handover deciding component 230 may determine to handover modems 106 of AirCard 108 of aircraft 104 from serving AG base station 110 to target AG base station 112 when the number of modems 106 that are in handover condition exceeds a threshold. In one example aspect, such threshold may be, for example, 2 modems 106 of AirCard 108 of aircraft 104.

Figure 7:
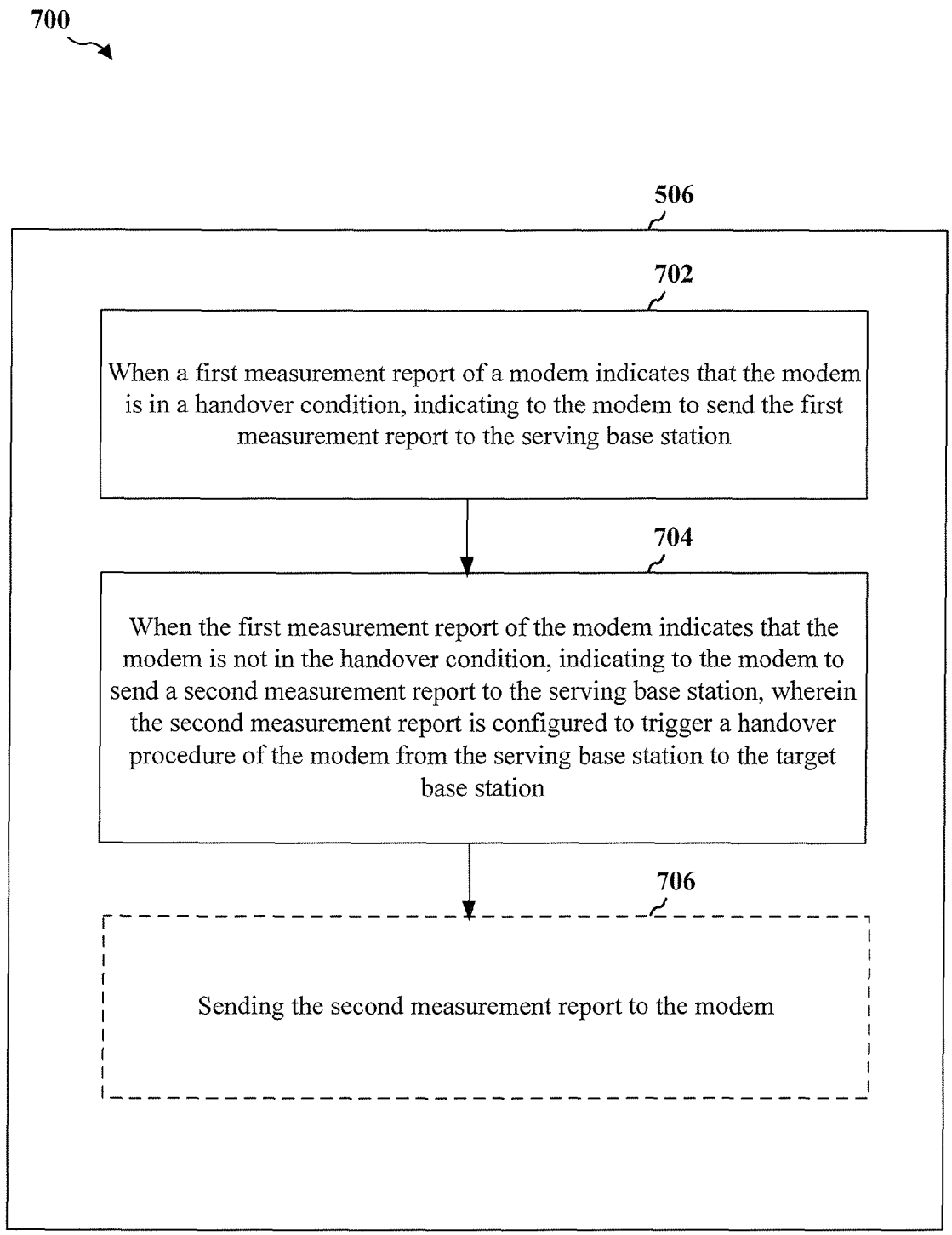

Referring now to FIG. 7, method 700 provides an example and optional aspect of block 506 of FIG. 5 for indicating to each of the two or more modems to send to the serving base station the measurement report configured to trigger the respective handover procedure.

At block 702, method 700 includes, when a first measurement report 232 of a modem indicates that the modem is in a handover condition, indicating to the modem to send the first measurement report to the serving base station. For example, in an aspect, when a first measurement report 232 of a modem 106 indicates that the modem 106 is in a handover condition, handover management component 102 and/or handover deciding component 230 may indicate to the modem 106 to send the first measurement report 232 to serving AG base station 110.

At block 704, method 700 includes when the first measurement report of the modem indicates that the modem is not in the handover condition, indicating to the modem to send a second measurement report to the serving base station, wherein the second measurement report is configured to trigger a handover procedure of the modem from the serving base station to the target base station. For example, in an aspect, when the first measurement report 232 of the modem 106 indicates that the modem 106 is not in the handover condition, handover management component 102 and/or handover deciding component 230 may indicate to the modem 106 to send a second measurement report 236 to serving AG base station 110, where the second measurement report 236 is configured to trigger a handover procedure of the modem 106 from serving AG base station 110 to target AG base station 112.

At optional block 706, method 700 includes, sending the second measurement to the modem. For example, in an aspect, when the first measurement report 232 of the modem 106 indicates that the modem 106 is not in the handover condition, handover management component 102 and/or handover deciding component 230 may send the second measurement report 236 to the modem 106 so the modem 106 may send the second measurement report 236 to serving AG base station 110 to trigger a handover procedure of the modem 106 from serving AG base station 110 to target AG base station 112.

Figure 8:
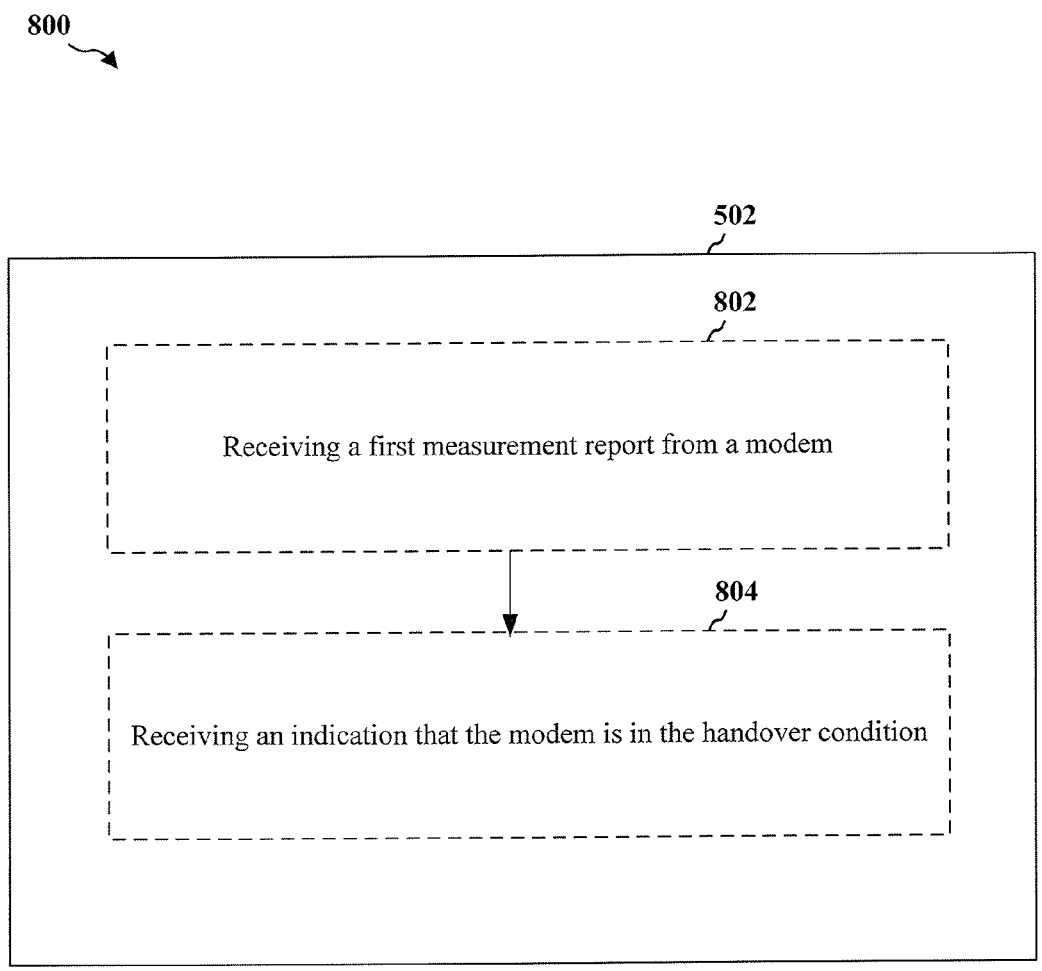

Referring now to FIG. 8, method 800 provides an example and optional aspect of block 502 of FIG. 5 for receiving of the at least one message indicative of the at least one measurement report.

At optional block 802, method 800 includes receiving a first measurement report from a modem. For example, in an aspect, handover management component 102 may receive the first measurement report 232 from modem 106.

At optional block 804, method 800 includes receiving an indication that the modem is in the handover condition. For example, in an aspect, when the first measurement report 232 indicates that the modem 106 is in a handover condition, handover management component 102 may receive an indication that the modem 106 is in the handover condition. For example, in an aspect, handover management component 102 may receive the first measurement report indication 234 from the modem 106 indicating that the modem 106 is in the handover condition.

Figure 9:
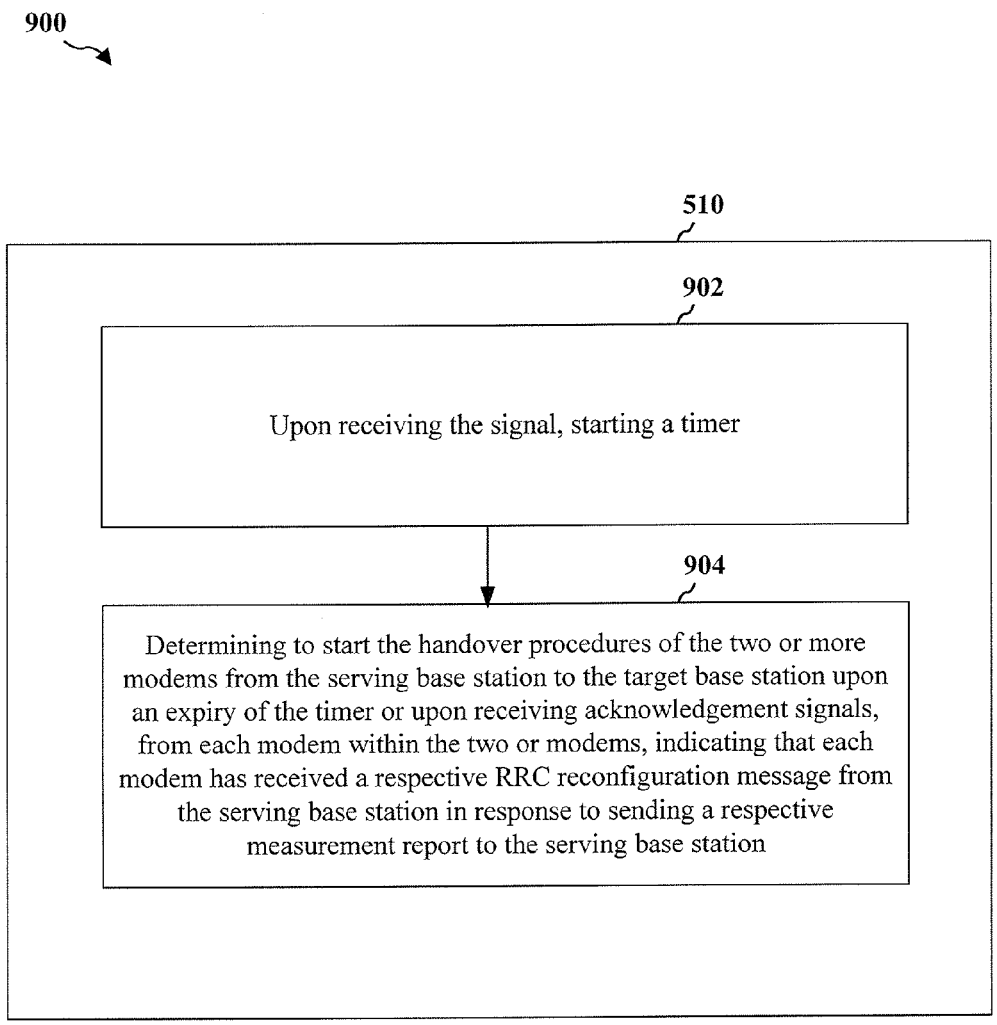

Referring now to FIG. 9, method 900 provides an example and optional aspect of block 510 of FIG. 5 for determining, based on the signal, whether to start the handover procedures of the two or more modems from the serving base station to the target base station.

At block 902, method 900 includes, upon receiving the signal, starting a timer. For example, in an aspect, upon receiving the RRC reconfiguration indication 240, handover management component 102 and/or handover procedure initiation component 238 may start an RRC reconfiguration initiation timer 242.

At block 904, method 900 includes determining to start the handover procedures of the two or more modems from the serving base station to the target base station upon an expiry of the timer or upon receiving acknowledgement signals, from each modem within the two or modems, indicating that each modem has received a respective RRC reconfiguration message from the serving base station in response to sending a respective measurement report to the serving base station. For example, in an aspect, handover management component 102 and/or handover procedure initiation component 238 may determine to start the handover procedures of the two or more modems 106 of AirCard 108 of aircraft 104 from the serving AG base station 110 to the target AG base station 112 upon an expiry of the RRC reconfiguration initiation timer 242 or upon receiving RRC reconfiguration indication 240 from each modem 106 of AirCard 108 of aircraft 104, indicating that each modem 106 of AirCard 108 of aircraft 104 has received a respective RRC reconfiguration message 246 from the serving AG base station 110 in response to sending a respective first measurement report 232 or second measurement report 236 to the serving AG base station 110. In some aspects, for example, each handover procedure includes a random access procedure and an RRC connection setup procedure.

Figure 10:
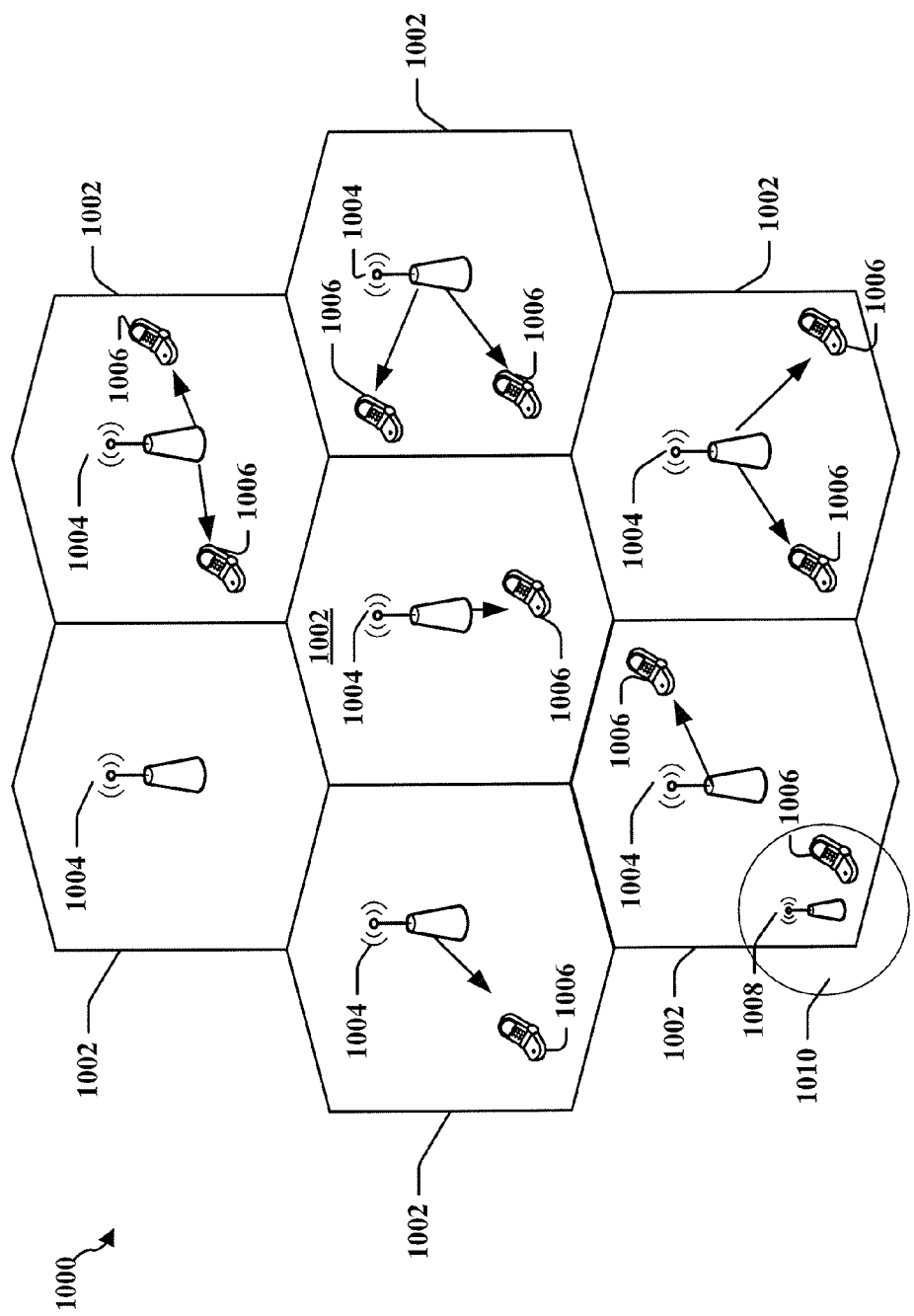
FIG. 10 is a diagram illustrating an example of an access network including aspects of the network architecture of FIG. 1.

Referring to FIG. 10, an example of an access network 1000 that may be part of an LTE network architecture is illustrated. Access network 500 includes UEs 506 which may be examples of modem 106 of FIG. 1 that communicates with handover management component 102 of FIG. 1. The UEs 1006 may be configured to perform any functions described herein with respect to modem 106 of FIG. 1. Also, access network 1000 includes eNBs 1004 and eNB 1008 which may be examples of eNB 206 and 208 FIG. 2.

In this example, the access network 1000 is divided into a number of cellular regions (cells) 1002. One or more lower power class eNBs 1008 may have cellular regions 1010 that overlap with one or more of the cells 1002. The lower power class eNB 1008 may be a small cell (e.g., a femto cell (e.g., home eNB (HeNB)), pico cell, micro cell, or remote radio head (RRH)). The macro eNBs 1004 are each assigned to a respective cell 1002 and are configured to provide access point to the EPC 110 for all the UEs 1006 in the cells 1002. There is no centralized controller in this example of an access network 1000, but a centralized controller may be used in alternative configurations. The eNBs 1004 are responsible for all radio related functions including radio bearer control, admission control, mobility control, scheduling, security, and connectivity to the serving gateway 216 of FIG. 2.

The modulation and multiple access scheme employed by the access network 1000 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 1004 may have multiple antennas supporting MIMO technology. The use of MIMO technology enables the eNBs 1004 to exploit the spatial domain to support spatial multiplexing, beamforming, and transmit diversity. Spatial multiplexing may be used to transmit different streams of data simultaneously on the same frequency. The data steams may be transmitted to a single UE 1006 to increase the data rate or to multiple UEs 1006 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 1006 with different spatial signatures, which enables each of the UE(s) 1006 to recover the one or more data streams destined for that UE 1006. On the UL, each UE 1006 transmits a spatially precoded data stream, which enables the eNB 1004 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 11:
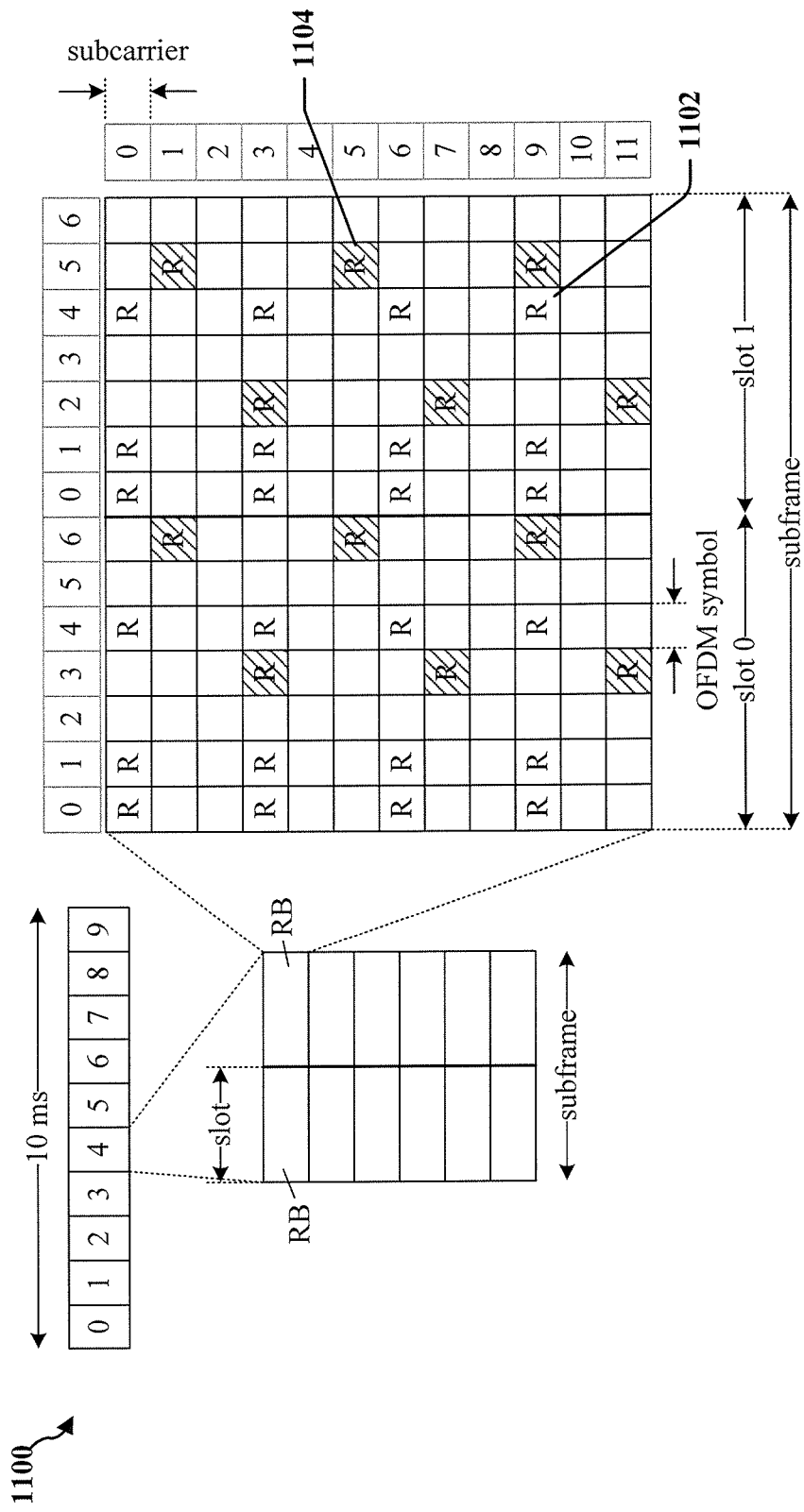
FIG. 11 is a diagram illustrating an example of a DL frame structure in LTE in aspects of the network architecture of FIG. 1.

FIG. 11 is a diagram 1100 illustrating an example of a DL frame structure in LTE and that may be used in FD and HD communications in an LTE network architecture such as the one shown in FIG. 2. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 1102, 1104, include DL reference signals (DL-RS). The DL-RS include Cell-specific RS (CRS) (also sometimes called common RS) 1102 and UE-specific RS (UE-RS) 1104. UE-RS 1104 are transmitted only on the resource blocks upon which the corresponding physical DL shared channel (PDSCH) is mapped. The number of bits carried by each resource element depends on the modulation scheme. Thus, the more resource blocks that a UE (e.g., modem 106 of FIGS. 1 and 2) receives and the higher the modulation scheme, the higher the data rate for the UE.

Figure 12:
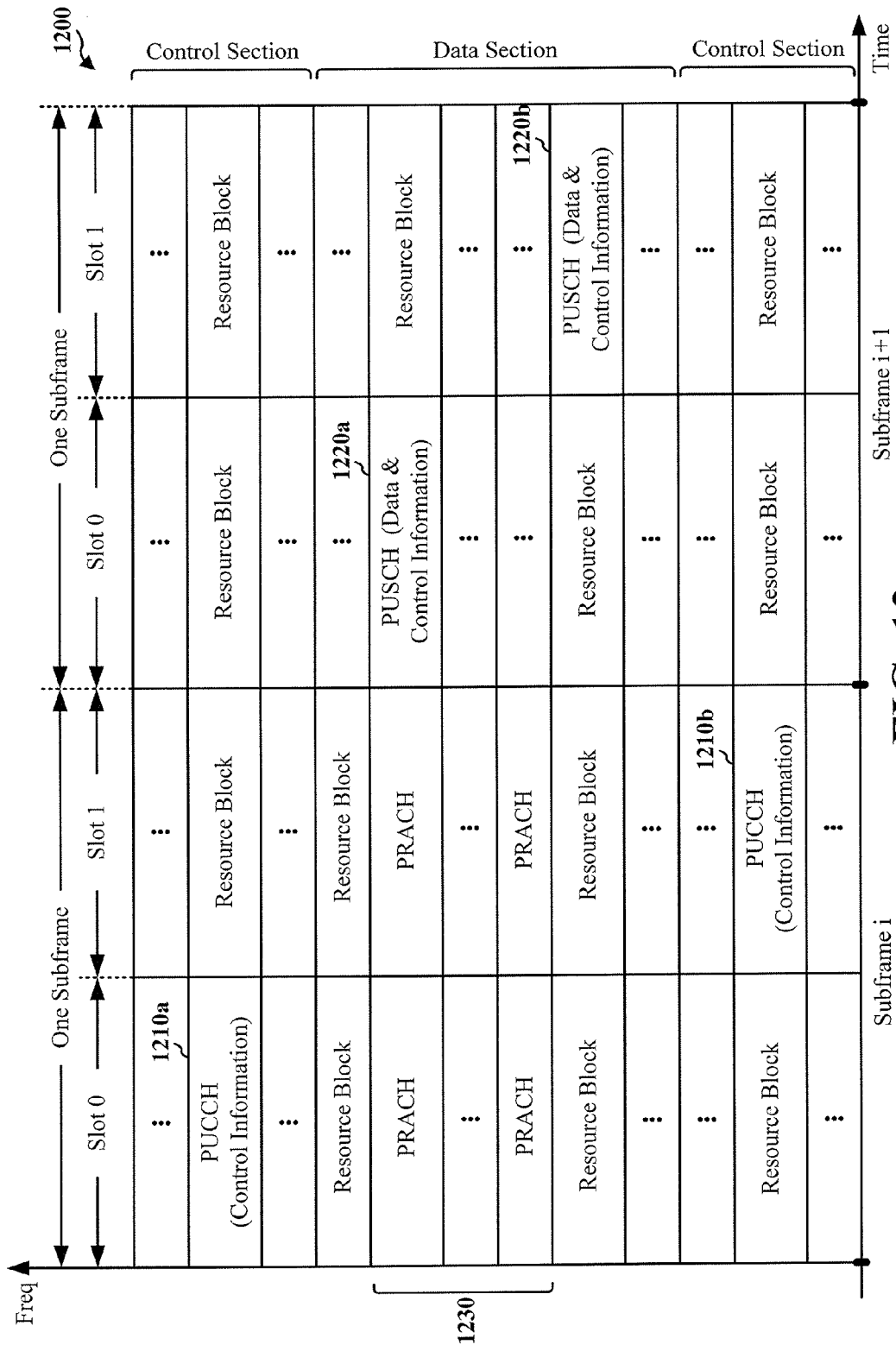
FIG. 12 is a diagram illustrating an example of an UL frame structure in LTE in aspects of the network architecture of FIG. 1.

FIG. 12 is a diagram 1200 illustrating an example of an UL frame structure in LTE and that may be used in FD and HD communications in an LTE network architecture such as the one shown in FIG. 2. The available resource blocks for the UL may be partitioned into a data section and a control section. The control section may be formed at the two edges of the system bandwidth and may have a configurable size. The resource blocks in the control section may be assigned to UEs (e.g., modem 106 of FIGS. 1 and 2) for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 1210a, 710b in the control section to transmit control information to an eNB (e.g., eNB 206 and 208 of FIG. 2). The UE may also be assigned resource blocks 1220a, 1220b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 1230. The PRACH 1230 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 13:
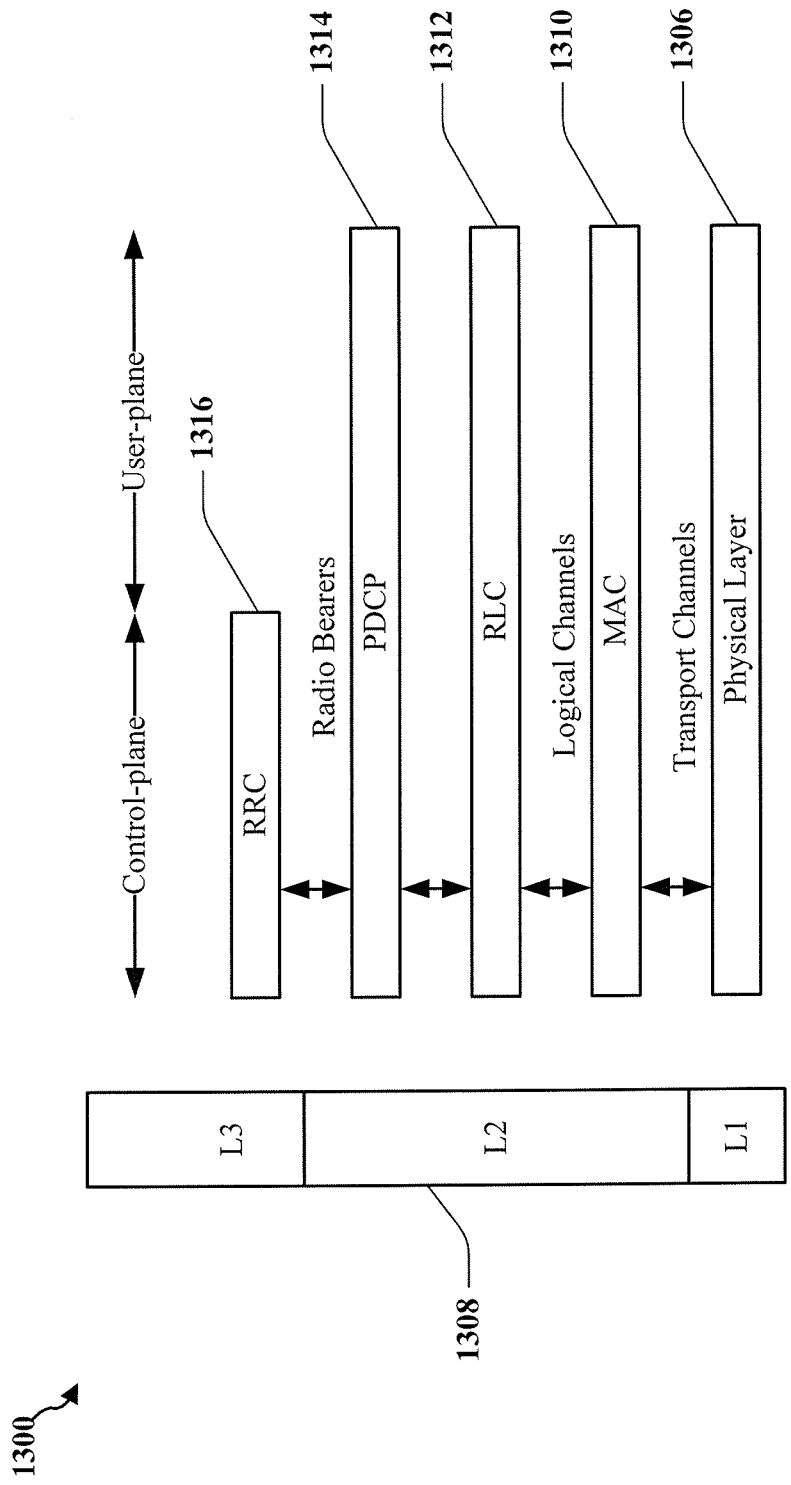
FIG. 13 is a diagram illustrating an example of a radio protocol architecture for the user and control planes in aspects of the network architecture of FIG. 1.

FIG. 13 is a diagram 1300 illustrating an example of a radio protocol architecture for the user and control planes in LTE and that may be used in FD and HD communications in an LTE network architecture such as the one shown in FIG. 2. The radio protocol architecture for the UE and the eNB (e.g., modem 106 and eNB 206 or 208 of FIG. 2) is shown with three layers: Layer 1, Layer 2, and Layer 3. Layer 1 (L1 layer) is the lowest layer and implements various physical layer signal processing functions. The L1 layer will be referred to herein as the physical layer 1306. Layer 2 (L2 layer) 1308 is above the physical layer 1306 and is responsible for the link between the UE and eNB over the physical layer 1306.

In the user plane, the L2 layer 1308 includes a media access control (MAC) sublayer 1310, a radio link control (RLC) sublayer 1312, and a packet data convergence protocol (PDCP) 1314 sublayer, which are terminated at the eNB on the network side. Although not shown, the UE may have several upper layers above the L2 layer 1308 including a network layer (e.g., IP layer) that is terminated at the PDN gateway 218 on the network side, and an application layer that is terminated at the other end of the connection (e.g., far end UE, server, etc.).

The PDCP sublayer 1314 provides multiplexing between different radio bearers and logical channels. The PDCP sublayer 1314 also provides header compression for upper layer data packets to reduce radio transmission overhead, security by ciphering the data packets, and handover support for UEs between eNBs. The RLC sublayer 1312 provides segmentation and reassembly of upper layer data packets, retransmission of lost data packets, and reordering of data packets to compensate for out-of-order reception due to hybrid automatic repeat request (HARQ). The MAC sublayer 1310 provides multiplexing between logical and transport channels. The MAC sublayer 1310 is also responsible for allocating the various radio resources (e.g., resource blocks) in one cell among the UEs. The MAC sublayer 1310 is also responsible for HARQ operations.

In the control plane, the radio protocol architecture for the UE and eNB is substantially the same for the physical layer 1306 and the L2 layer 1308 with the exception that there is no header compression function for the control plane. The control plane also includes a radio resource control (RRC) sublayer 1316 in Layer 3 (L3 layer). The RRC sublayer 1316 is responsible for obtaining radio resources (i.e., radio bearers) and for configuring the lower layers using RRC signaling between the eNB and the UE.

Figure 14:
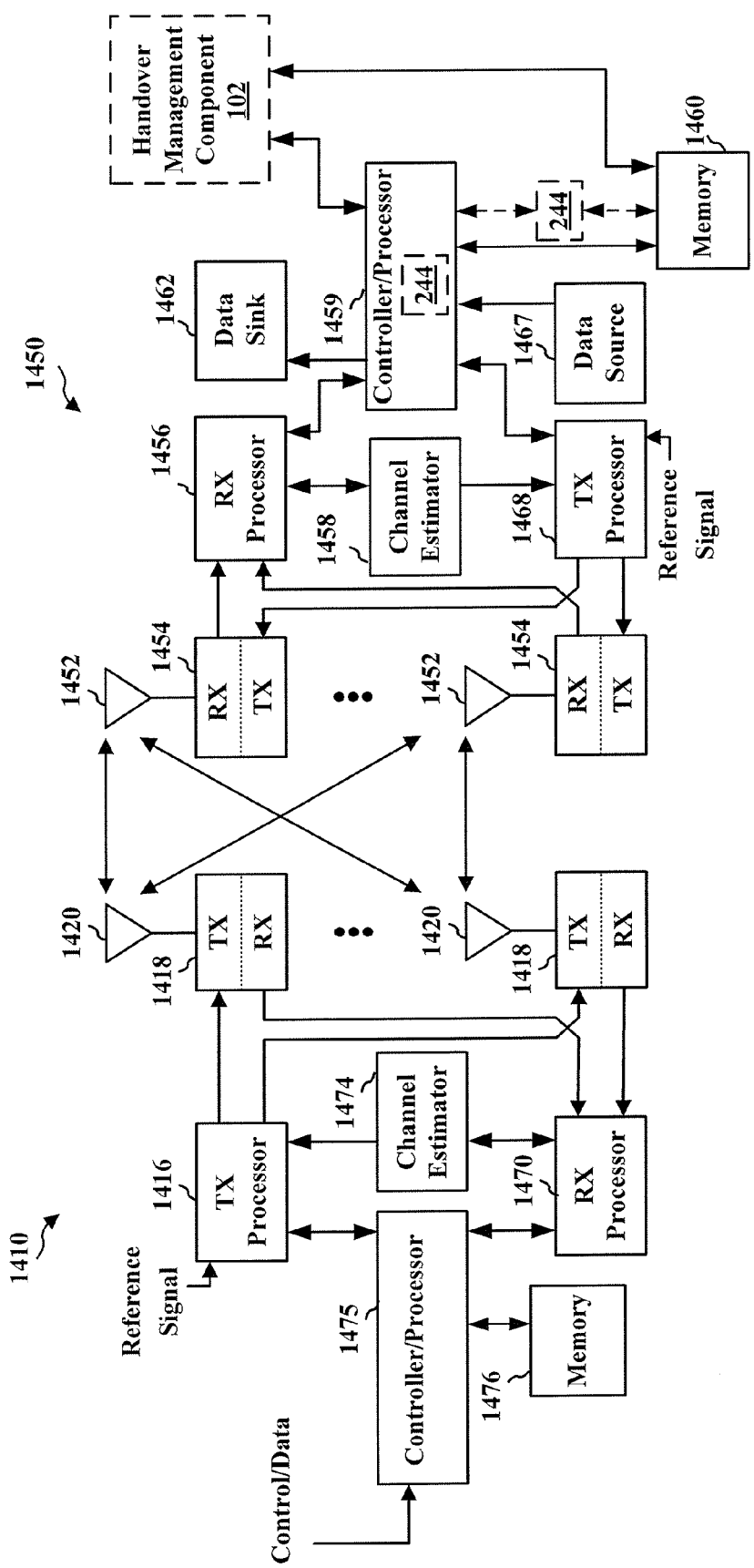
FIG. 14 is a diagram illustrating an example of an evolved Node B and user equipment in an access network in aspects of the network architecture of FIG. 1.

FIG. 14 is a block diagram of an eNB 1410 in communication with a UE 1450 in an access network, where UE 1450 may be an example of modem 106 of FIGS. 1 and 2 communicating with handover management component 102 of FIGS. 1 and 2. UE 1450 may be configured to perform any functions described herein with respect to modem 106 of FIGS. 1 and 2. Also, eNB 1410 may be an example of eNB 206 and/or 208 of FIG. 2. eNB 1410 may be configured to perform any functions described herein with respect to eNB 206 and/or 208 of FIG. 2.

In the DL, upper layer packets from the core network are provided to a controller/processor 1475. The controller/processor 1475 implements the functionality of the L2 layer. In the DL, the controller/processor 1475 provides header compression, ciphering, packet segmentation and reordering, multiplexing between logical and transport channels, and radio resource allocations to the UE 1450 based on various priority metrics. The controller/processor 1475 is also responsible for HARQ operations, retransmission of lost packets, and signaling to the UE 1450.

The transmit (TX) processor 1416 implements various signal processing functions for the L1 layer (i.e., physical layer). The signal processing functions includes coding and interleaving to facilitate forward error correction (FEC) at the UE 1450 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 1474 may be used to determine the coding and modulation scheme, as well as for spatial processing. The channel estimate may be derived from a reference signal and/or channel condition feedback transmitted by the UE 1450. Each spatial stream is then provided to a different antenna 1420 via a separate transmitter 1418TX. Each transmitter 1418TX modulates an RF carrier with a respective spatial stream for transmission.

At the UE 1450, each receiver 1454RX receives a signal through its respective antenna 1452. Each receiver 1454RX recovers information modulated onto an RF carrier and provides the information to the receive (RX) processor 1456. The RX processor 1456 implements various signal processing functions of the L1 layer. The RX processor 1456 performs spatial processing on the information to recover any spatial streams destined for the UE 1450. If multiple spatial streams are destined for the UE 1450, they may be combined by the RX processor 1456 into a single OFDM symbol stream. The RX processor 1456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 1410. These soft decisions may be based on channel estimates computed by the channel estimator 1458. The soft decisions are then decoded and deinterleaved to recover the data and control signals that were originally transmitted by the eNB 1410 on the physical channel. The data and control signals are then provided to the controller/processor 1459.

The controller/processor 1459 implements the L2 layer. The controller/processor 1459 can be associated with a memory 1460 that stores program codes and data. The memory 1460 may be referred to as a computer-readable medium. In the UL, the controller/processor 1459 provides demultiplexing between transport and logical channels, packet reassembly, deciphering, header decompression, control signal processing to recover upper layer packets from the core network. The upper layer packets are then provided to a data sink 1462, which represents all the protocol layers above the L2 layer. Various control signals may also be provided to the data sink 1462 for L3 processing. The controller/processor 1459 is also responsible for error detection using an acknowledgement (ACK) and/or negative acknowledgement (NACK) protocol to support HARQ operations.

In the UL, a data source 1467 is used to provide upper layer packets to the controller/processor 1459. The data source 1467 represents all protocol layers above the L2 layer. Similar to the functionality described in connection with the DL transmission by the eNB 1410, the controller/processor 1459 implements the L2 layer for the user plane and the control plane by providing header compression, ciphering, packet segmentation and reordering, and multiplexing between logical and transport channels based on radio resource allocations by the eNB 1410. The controller/processor 1459 is also responsible for HARQ operations, retransmission of lost packets, and signaling to the eNB 1410.

Channel estimates derived by a channel estimator 1458 from a reference signal or feedback transmitted by the eNB 1410 may be used by the TX processor 1468 to select the appropriate coding and modulation schemes, and to facilitate spatial processing. The spatial streams generated by the TX processor 1468 are provided to different antenna 1452 via separate transmitters 1454TX. Each transmitter 1454TX modulates an RF carrier with a respective spatial stream for transmission.

The UL transmission is processed at the eNB 1410 in a manner similar to that described in connection with the receiver function at the UE 1450. Each receiver 1418RX receives a signal through its respective antenna 1420. Each receiver 1418RX recovers information modulated onto an RF carrier and provides the information to a RX processor 1470. The RX processor 1470 may implement the L1 layer.

The controller/processor 1475 implements the L2 layer. The controller/processor 1475 can be associated with a memory 1476 that stores program codes and data. The memory 1476 may be referred to as a computer-readable medium. In the UL, the control/processor 1475 provides demultiplexing between transport and logical channels, packet reassembly, deciphering, header decompression, control signal processing to recover upper layer packets from the UE 1450. Upper layer packets from the controller/processor 1475 may be provided to the core network. The controller/processor 1475 is also responsible for error detection using an ACK and/or NACK protocol to support HARQ operations.

Figure 15:
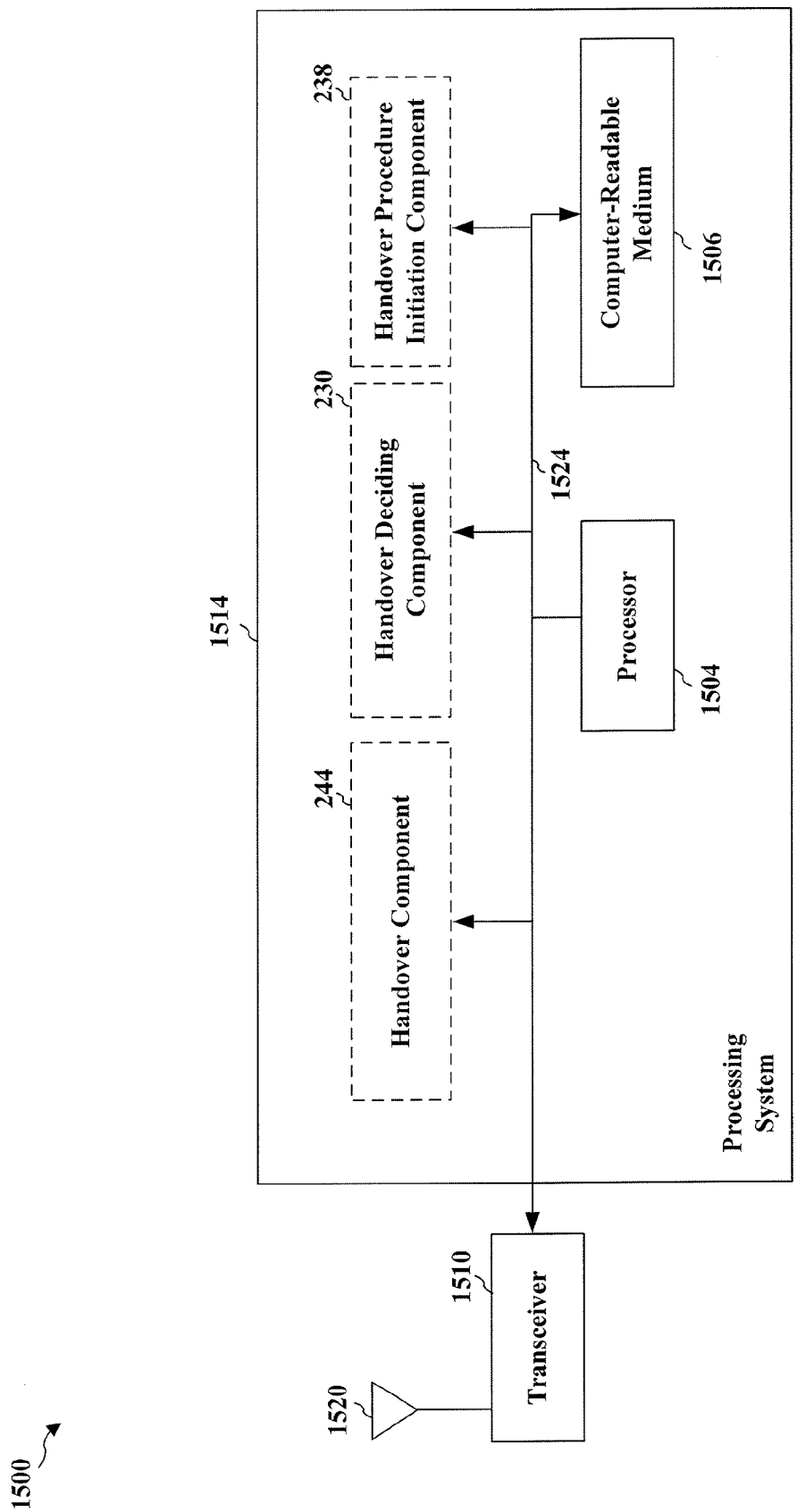
FIG. 15 is a diagram illustrating an example of a hardware implementation for an apparatus employing a processing system including aspects of the network architecture of FIG. 1.

FIG. 15 is a diagram illustrating an example of a hardware implementation for an apparatus 1500 employing a processing system 1014, where apparatus 1500 may be an example of serving AG base station 110 and/or target AG base station 112 of FIG. 1, an example of eNBs 106, 108 of FIG. 2, an example of modem 106 of FIGS. 1 and 2 including and executing handover component 244 of FIG. 2, or an example of handover management component 102 of FIGS. 1 and 2 including and executing handover deciding component 230 and/or handover procedure initiation component 238 of FIG. 2, as described herein. In this aspect, handover component 244, handover deciding component 230, and handover procedure initiation component 238 are illustrated as being implemented separate from, but in communication with, a processor 1504 and a computer-readable medium 1506. However, in this aspect, handover component 244, handover deciding component 230, and/or handover procedure initiation component 238 may be implemented as one or more processor modules in the processor 1504, as computer-readable instructions stored in the computer-readable medium 1506 and executed by the processor 1504, or some combination of both.

The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, handover component 244, handover deciding component 230, handover procedure initiation component 238, and the computer-readable medium 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The processing system 1514 includes a processor 1504 coupled to a computer-readable medium 1506. The processor 1504 is responsible for general processing, including the execution of software stored on the computer-readable medium 1506. The software, when executed by the processor 1504, causes the processing system 1514 to perform the various functions described supra for any particular apparatus. The computer-readable medium 1506 may also be used for storing data that is manipulated by the processor 1504 when executing software. The processing system may further include respective ones of handover component 244, handover deciding component 230, and handover procedure initiation component 238. The modules may be software modules running in the processor 1504, resident/stored in the computer readable medium 1506, one or more hardware modules coupled to the processor 1504, or some combination thereof. The processing system 1514 may be a component of the eNB 1410 or the UE 1450 and may include a respective one of the memory 1476, 1460, and/or at least one of the TX processor 1416, 1468, the RX processor 1470, 1456, and the controller/processor 1475, 1459.

In one configuration, the apparatus 1500 for wireless communication includes means for determining a first echo cancellation metric indicative of a first amount of echo cancellation as a first function of a first transmit power of a first wireless communications device, and means for providing the first echo cancellation metric to a scheduling entity that is configured to schedule full duplex (FD) or half duplex (HD) communication resources for the first wireless communications device. The aforementioned means may be one or more of the aforementioned modules of the apparatus 1500 and/or the processing system 1514 of the apparatus 1500 configured to perform the functions recited by the aforementioned means. As described supra, the processing system 1514 may include a respective one of the TX Processor 1416, 1468, the RX Processor 1470, 1456, and the controller/processor 1475, 1459. As such, in one configuration, the aforementioned means may be a respective one of the TX Processor 1416, 1468, the RX Processor 1470, 1456, and the controller/processor 1475, 1459, configured to perform the functions recited by the aforementioned means.

Several aspects of telecommunication systems have been presented with reference to various apparatus and methods. These apparatus and methods may be described in the this detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

It is understood that the specific order or hierarchy of steps in the processes disclosed is an illustration of one example of such an approach. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

In the subject disclosure, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for an apparatus configured to be located in an airborne vehicle to manage handover procedures of two or more modems from a serving base station to a target base station, the method comprising:

receiving, by the apparatus when located in the airborne vehicle, at least one message indicative of at least one first measurement report of radio conditions from at least one modem of the two or more modems;

determining, based on the at least one received message, whether to handover the two or more modems from the serving base station to the target base station, the serving base station and the target base station being configured to be located on the ground; and upon determining to handover the two or more modems from the serving base station to the target base station, sending a corresponding indication to each of the two or more modems to send to the serving base station a measurement report configured to trigger a respective handover procedure from the serving base station to the target base station, the two or more modems being configured to send the measurement report to the serving base station via an antenna system in the airborne vehicle, wherein each corresponding indication indicates whether a given modem of the two or more modems sends the first measurement report or a second measurement report to the serving base station, where the first measurement report and second measurement report are different.

2. The method of claim 1, wherein the determining, based on the at least one message, whether to handover the two or more modems from the serving base station to the target base station comprises:

determining, based on the at least one received message, that a number of modems within the two or more modems are in a handover condition; and determining to handover the two or more modems from the serving base station to the target base station when the number of modems satisfies a threshold.

3. The method of claim 1, wherein the indicating to each of the two or more modems to send to the serving base station the measurement report configured to trigger the respective handover procedure comprises:

when the first measurement report of a modem indicates that the modem is in a handover condition, indicating to the modem to send the first measurement report to the serving base station; and when the first measurement report of the modem indicates that the modem is not in the handover condition, indicating to the modem to send the second measurement report to the serving base station, wherein the second measurement report is configured to trigger a handover procedure of the modem from the serving base station to the target base station.

4. The method of claim 3, wherein, when the first measurement report of the modem indicates that the modem is not in the handover condition, the indicating to each of the two or more modems to send to the serving base station the measurement report configured to trigger the respective handover procedure further comprises:

sending the second measurement report to the modem.

5. The method of claim 1, wherein the receiving of the at least one message indicative of the at least one first measurement report comprises at least one of:

receiving the first measurement report from a modem; or receiving an indication that the modem is in the handover condition.

6. The method of claim 1, further comprising:

receiving a signal, from a first modem of the two or more modems, indicating that the first modem has received a radio resource control (RRC) reconfiguration message from the serving base station in response to the first modem sending to the serving base station the measurement report;

determining, based on the signal, whether to start handover procedures of the two or more modems from the serving base station to the target base station; and upon determining to start the handover procedures of the two or more modems from the serving base station to the target base station, indicating to each of the two or more modems to start to perform a respective handover procedure from the serving base station to the target base station.

7. The method of claim 6, wherein the determining, based on the signal, whether to start the handover procedures of the two or more modems from the serving base station to the target base station further comprises:

upon receiving the signal, starting a timer; and determining to start the handover procedures of the two or more modems from the serving base station to the target base station upon an expiry of the timer or upon receiving acknowledgement signals, from each modem within the two or modems, indicating that each modem has received a respective RRC reconfiguration message from the serving base station in response to sending a respective measurement report to the serving base station.

8. The method of claim 6, wherein each of the handover procedures comprises:

a random access procedure; and an RRC connection setup procedure.

9. The method of claim 6, the method further comprising:

upon determining to start the handover procedures of the two or more modems from the serving base station to the target base station, notifying the antenna system in the airborne vehicle to steer a beam from the serving base station to the target base station.

10. An apparatus configured to be located in an airborne vehicle for managing handover procedures of two or more modems from a serving base station to a target base station, the apparatus comprising:

means for receiving at least one message indicative of at least one first measurement report of radio conditions from at least one modem of the two or more modems;

means for determining, based on the at least one received message, whether to handover the two or more modems from the serving base station to the target base station, the serving base station and the target base station being configured to be located on the ground; and means for, upon determining to handover the two or more modems from the serving base station to the target base station, sending a corresponding indication to each of the two or more modems to send to the serving base station a measurement report configured to trigger a respective handover procedure from the serving base station to the target base station, the two or more modems being configured to send the measurement report to the serving base station via an antenna system in the airborne vehicle, wherein each corresponding indication indicates whether a given modem of the two or more modems sends the first measurement report or a second measurement report to the serving base station, where the first measurement report and second measurement report are different.

11. The apparatus of claim 10, wherein the means for determining, based on the at least one message, whether to handover the two or more modems from the serving base station to the target base station comprises:

means for determining, based on the at least one received message, that a number of modems within the two or more modems are in a handover condition; and means for determining to handover the two or more modems from the serving base station to the target base station when the number of modems satisfies a threshold.

12. The apparatus of claim 10, wherein the means for indicating to each of the two or more modems to send to the serving base station the measurement report configured to trigger the respective handover procedure comprises:

means for, when the first measurement report of a modem indicates that the modem is in a handover condition, indicating to the modem to send the first measurement report to the serving base station; and means for, when the first measurement report of the modem indicates that the modem is not in the handover condition, indicating to the modem to send the second measurement report to the serving base station, wherein the second measurement report is configured to trigger a handover procedure of the modem from the serving base station to the target base station.

13. The apparatus of claim 12, wherein the means for indicating to each of the two or more modems to send to the serving base station the measurement report configured to trigger the respective handover procedure further comprises:

means for, when the first measurement report of the modem indicates that the modem is not in the handover condition, sending the second measurement report to the modem.

14. The apparatus of claim 10, wherein the means for receiving of the at least one message indicative of the at least one first measurement report comprises at least one of:

means for receiving the first measurement report from a modem; or means for, receiving an indication that the modem is in the handover condition.

15. The apparatus of claim 10, further comprising:

means for receiving a signal, from a first modem of the two or more modems, indicating that the first modem has received a radio resource control (RRC) reconfiguration message from the serving base station in response to the first modem sending to the serving base station the measurement report;

means for determining, based on the signal, whether to start handover procedures of the two or more modems from the serving base station to the target base station; and means for, upon determining to start the handover procedures of the two or more modems from the serving base station to the target base station, indicating to each of the two or more modems to start to perform a respective handover procedure from the serving base station to the target base station.

16. The apparatus of claim 15, wherein the means for determining, based on the signal, whether to start the handover procedures of the two or more modems from the serving base station to the target base station further comprises:

means for, upon receiving the signal, starting a timer; and means for determining to start the handover procedures of the two or more modems from the serving base station to the target base station upon an expiry of the timer or upon receiving acknowledgement signals, from each modem within the two or modems, indicating that each modem has received a respective RRC reconfiguration message from the serving base station in response to sending a respective measurement report to the serving base station.

17. The apparatus of claim 15, wherein each of the handover procedures comprises:
a random access procedure; and
an RRC connection setup procedure.

18. The apparatus of claim 15, the apparatus further comprising:
means for, upon determining to start the handover procedures of the two or more modems from the serving base station to the target base station, notifying the antenna system in the airborne vehicle to steer a beam from the serving base station to the target base station.

19. An apparatus configured to be located in an airborne vehicle for managing handover procedures of two or more modems from a serving base station to a target base station, the apparatus comprising:
a memory,
a processor communicatively coupled to the memory, wherein the processor and the memory are configured to:
receive, when the apparatus is located in the airborne vehicle, at least one message indicative of at least one first measurement report of radio conditions from at least one modem of the two or more modems; and
determine, based on the at least one received message, whether to handover the two or more modems from the serving base station to the target base station, the serving base station and the target base station being configured to be located on the ground;
wherein the processor and the memory are further configured to, upon determining to handover the two or more modems from the serving base station to the target base station, sending a corresponding indication to each of the two or more modems to send to the serving base station a measurement report configured to trigger a respective handover procedure from the serving base station to the target base station, the two or more modems being configured to send the measurement report to the serving base station via an antenna system in the airborne vehicle,
wherein each corresponding indication indicates whether a given modem of the two or more modems sends the first measurement report or a second measurement report to the serving base station, where the first measurement report and second measurement report are different.

20. The apparatus of claim 19, wherein to determine, based on the at least one message, whether to handover the two or more modems from the serving base station to the target base station, the processor and the memory are configured to:
determine, based on the at least one received message, that a number of modems within the two or more modems are in a handover condition; and
determine to handover the two or more modems from the serving base station to the target base station when the number of modems satisfies a threshold.

21. The apparatus of claim 19, wherein to indicate to each of the two or more modems to send to the serving base station the measurement report configured to trigger the respective handover procedure, the processor and the memory are configured to:
when the first measurement report of a modem indicates that the modem is in a handover condition, indicate to the modem to send the first measurement report to the serving base station; and
when the first measurement report of the modem indicates that the modem is not in the handover condition, indicate to the modem to send the second measurement report to the serving base station, wherein the second measurement report is configured to trigger a handover procedure of the modem from the serving base station to the target base station.

22. The apparatus of claim 21, wherein, when the first measurement report of the modem indicates that the modem is not in the handover condition, to indicate to each of the two or more modems to send to the serving base station the measurement report configured to trigger the respective handover procedure, the processor and the memory are further configured to:
send the second measurement report to the modem.

23. The apparatus of claim 19, wherein to receive the at least one message indicative of the at least one first measurement report, the processor and the memory are configured to perform at least one of:
receiving the first measurement report from a modem; or
receiving an indication that the modem is in the handover condition.

24. The apparatus of claim 19, wherein the processor and the memory are further configured to:
receive a signal, from a first modem of the two or more modems, indicating that the first modem has received a radio resource control (RRC) reconfiguration message from the serving base station in response to the first modem sending to the serving base station the measurement report;
determine, based on the signal, whether to start handover procedures of the two or more modems from the serving base station to the target base station; and
upon determining to start the handover procedures of the two or more modems from the serving base station to the target base station, indicate to each of the two or more modems to start to perform a respective handover procedure from the serving base station to the target base station.

25. The apparatus of claim 24, wherein to determine, based on the signal, whether to start the handover procedures of the two or more modems from the serving base station to the target base station, the processor and the memory are further configured to:
upon receiving the signal, start a timer; and
determine to start the handover procedures of the two or more modems from the serving base station to the target base station upon an expiry of the timer or upon receiving acknowledgement signals, from each modem within the two or modems, indicating that each modem has received a respective RRC reconfiguration message from the serving base station in response to sending a respective measurement report to the serving base station.

26. The apparatus of claim 24, wherein each of the handover procedures comprises: a random access procedure; and
an RRC connection setup procedure.

27. The apparatus of claim 24, wherein the processor and the memory are further configured to:
upon determining to start the handover procedures of the two or more modems from the serving base station to the target base station, notify the antenna system in the airborne vehicle to steer a beam from the serving base station to the target base station.

28. A non-transitory computer-readable medium executable by a processor in an apparatus configured to be located in an airborne vehicle for managing handover procedures of two or more modems from a serving base station to a target base station, comprising:
- code for receiving, when the apparatus is located in the airborne vehicle, at least one message indicative of at least one first measurement report of radio conditions from at least one modem of the two or more modems;
- code for determining, based on the at least one received message, whether to handover the two or more modems from the serving base station to the target base station, the serving base station and the target base station being configured to be located on the ground; and
- code for, upon determining to handover the two or more modems from the serving base station to the target base station, sending a corresponding indication to each of the two or more modems to send to the serving base station a measurement report configured to trigger a respective handover procedure from the serving base station to the target base station, the two or more modems being configured to send the measurement report to the serving base station via an antenna system in the airborne vehicle,
- wherein each corresponding indication indicates whether a given modem of the two or more modems sends the first measurement report or a second measurement report to the serving base station, where the first measurement report and second measurement report are different.

29. The computer-readable medium of claim 28, wherein the code for determining, based on the at least one message, whether to handover the two or more modems from the serving base station to the target base station comprises:
- code for determining, based on the at least one received message, that a number of modems within the two or more modems are in a handover condition; and
- code for determining to handover the two or more modems from the serving base station to the target base station when the number of modems satisfies a threshold.

30. The computer-readable medium of claim 28, wherein the code for indicating to each of the two or more modems to send to the serving base station the measurement report configured to trigger the respective handover procedure comprises:
- code for, when the first measurement report of a modem indicates that the modem is in a handover condition, indicating to the modem to send the first measurement report to the serving base station; and
- code for, when the first measurement report of the modem indicates that the modem is not in the handover condition, indicating to the modem to send the second measurement report to the serving base station, wherein the second measurement report is configured to trigger a handover procedure of the modem from the serving base station to the target base station.

* * * * *